United States Patent
Zhang et al.

(10) Patent No.: US 9,572,077 B2
(45) Date of Patent: *Feb. 14, 2017

(54) INTER-RAT MOBILITY OF IN-DEVICE COEXISTENCE

(71) Applicant: Intel Corporation, Santa Clara, CA (US)

(72) Inventors: Yujian Zhang, Beijing (CN); Mo-Han Fong, Sunnyvale, CA (US); Francois Deparis, Nuremberg (DE); Bruno Jechoux, Antibes (FR)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/990,239

(22) Filed: Jan. 7, 2016

(65) Prior Publication Data

US 2016/0119842 A1    Apr. 28, 2016

Related U.S. Application Data

(63) Continuation of application No. 14/119,228, filed as application No. PCT/US2013/067306 on Oct. 29, 2013, now Pat. No. 9,253,698.

(Continued)

(51) Int. Cl.
*H04W 4/00* (2009.01)
*H04W 36/20* (2009.01)
(Continued)

(52) U.S. Cl.
CPC ........... *H04W 36/20* (2013.01); *H04B 7/0417* (2013.01); *H04B 7/0452* (2013.01);
(Continued)

(58) Field of Classification Search
CPC .. H04W 72/1231; H04W 24/04; H04W 36/30; H04W 28/046; H04W 16/24; H04W 24/08; H04W 52/0216; H04W 28/24; H04W 24/02; H04W 88/16; H04W 88/06;H04W 88/02; H04W 88/08; H04W 60/04; H04W 16/26; H04W 28/0268; H04W 76/046; H04W 72/0446; H04W 4/005; H04W 72/0413; H04W 52/0235; H04W 8/005; H04W 72/042; H04W 36/20; H04W 72/08; H04W 72/06; H04W 76/048; H04W 24/10; H04W 36/14; H04W 64/003; H04W 76/023; H04W 16/20; H04L 5/0035; H04L 5/0046; H04L 5/006; H04L 5/0048; H04L 61/3005; H04L 61/3075; H04J 3/0614; H04J 11/00; Y02B 60/50; H04B 7/0626; H04B 7/0452; H04B 7/0417
See application file for complete search history.

(56) References Cited

U.S. PATENT DOCUMENTS 8,072,963 B2   12/2011   Suzuki
8,150,477 B2   4/2012    Cho et al.
(Continued)

FOREIGN PATENT DOCUMENTS

CN    104782157 A    7/2015
CN    104782166 A    7/2015
(Continued)

OTHER PUBLICATIONS

"3GPP MTC Standard TTA M2M Seminar", ETRI Standards Research Center, [Online] retrieved from the internet: <edu.tta.or.kr/sub3/down.php?No=123&file=M2M_1-4.pdf>, (Oct. 23, 2012).

(Continued)

*Primary Examiner* — Clemence Han
(74) *Attorney, Agent, or Firm* — Schwegman Lundberg & Woessner, P.A.

(57) ABSTRACT

Embodiments of system, device, and method configurations for managing inter-radio access technology (inter-RAT) mobility of handovers between a UMTS Terrestrial Radio Access Network (UTRAN) or GSM EDGE Radio Access (Continued)

Network (GERAN) and an evolved UMTS Terrestrial Radio Access Network (E-UTRAN) to avoid scenarios of in-device coexistence (IDC) interference are disclosed herein. In one example, the existence and types of IDC interference with an E-UTRAN Long Term Evolution (LTE)/Long Term Evolution-Advanced (LTE-A) network are determined and communicated to the UTRAN/GERAN in an IDC indication signal. The IDC indication signal may communicate the existence and type of IDC interference occurring at user equipment, such as between licensed LTE/LTE-A and unlicensed industrial scientific medical (ISM) radio frequency bands. Accordingly, the UTRAN/GERAN may use information provided from the IDC indication signal to prevent a handover to the E-UTRAN that would result in IDC interference.

28 Claims, 8 Drawing Sheets

Related U.S. Application Data

(60) Provisional application No. 61/721,436, filed on Nov. 1, 2012.

(51) Int. Cl.

| | | |
|---|---|---|
| *H04W 28/24* | (2009.01) | |
| *H04W 52/02* | (2009.01) | |
| *H04W 24/08* | (2009.01) | |
| *H04J 3/06* | (2006.01) | |
| *H04L 5/00* | (2006.01) | |
| *H04W 16/24* | (2009.01) | |
| *H04W 8/00* | (2009.01) | |
| *H04W 72/04* | (2009.01) | |
| *H04W 76/02* | (2009.01) | |
| *H04B 7/04* | (2006.01) | |
| *H04B 7/06* | (2006.01) | |
| *H04W 28/02* | (2009.01) | |
| *H04W 76/04* | (2009.01) | |
| *H04L 29/12* | (2006.01) | |
| *H04W 16/20* | (2009.01) | |
| *H04W 16/26* | (2009.01) | |
| *H04W 60/04* | (2009.01) | |
| *H04W 64/00* | (2009.01) | |
| *H04W 36/14* | (2009.01) | |
| *H04W 24/10* | (2009.01) | |
| *H04J 11/00* | (2006.01) | |
| *H04W 28/04* | (2009.01) | |
| *H04W 72/06* | (2009.01) | |
| *H04W 72/08* | (2009.01) | |
| *H04W 36/30* | (2009.01) | |
| *H04W 72/12* | (2009.01) | |
| *H04W 24/04* | (2009.01) | |
| *H04W 88/02* | (2009.01) | |
| *H04W 88/08* | (2009.01) | |
| *H04W 88/06* | (2009.01) | |
| *H04W 88/16* | (2009.01) | |
| *H04W 24/02* | (2009.01) | |

(52) U.S. Cl.
CPC .......... *H04B 7/0626* (2013.01); *H04J 3/0614* (2013.01); *H04J 11/00* (2013.01); *H04L 5/0046* (2013.01); *H04L 5/0048* (2013.01); *H04L 61/3005* (2013.01); *H04L 61/3075* (2013.01); *H04W 4/005* (2013.01); *H04W 8/005* (2013.01); *H04W 16/20* (2013.01); *H04W 16/24* (2013.01); *H04W 16/26* (2013.01); *H04W 24/04* (2013.01); *H04W 24/08* (2013.01); *H04W 24/10* (2013.01); *H04W 28/0268* (2013.01); *H04W 28/046* (2013.01); *H04W 28/24* (2013.01); *H04W 36/14* (2013.01); *H04W 36/30* (2013.01); *H04W 52/0216* (2013.01); *H04W 52/0235* (2013.01); *H04W 60/04* (2013.01); *H04W 64/003* (2013.01); *H04W 72/042* (2013.01); *H04W 72/0413* (2013.01); *H04W 72/0446* (2013.01); *H04W 72/06* (2013.01); *H04W 72/08* (2013.01); *H04W 72/1231* (2013.01); *H04W 76/023* (2013.01); *H04W 76/046* (2013.01); *H04W 76/048* (2013.01); *H04L 5/006* (2013.01); *H04W 24/02* (2013.01); *H04W 88/02* (2013.01); *H04W 88/06* (2013.01); *H04W 88/08* (2013.01); *H04W 88/16* (2013.01); *Y02B 60/50* (2013.01)

(56) References Cited

U.S. PATENT DOCUMENTS

| | | |
|---|---|---|
| 8,174,957 B2 | 5/2012 | Ko et al. |
| 8,660,197 B2 | 2/2014 | Lindgren et al. |
| 8,681,627 B2 | 3/2014 | Choudhury et al. |
| 8,885,458 B2 | 11/2014 | Diachina et al. |
| 9,042,881 B2 * | 5/2015 | Kwon .................. H04B 1/1027 370/242 |
| 9,100,160 B2 | 8/2015 | Tarradell et al. |
| 9,225,399 B2 | 12/2015 | Shan et al. |
| 9,253,698 B2 | 2/2016 | Zhang et al. |
| 2001/0051994 A1 | 12/2001 | Serizawa et al. |
| 2004/0208183 A1 | 10/2004 | Balachandran et al. |
| 2005/0026616 A1 | 2/2005 | Cavalli et al. |
| 2005/0124372 A1 | 6/2005 | Lundby et al. |
| 2006/0058033 A1 | 3/2006 | Marsan et al. |
| 2007/0111747 A1 | 5/2007 | Lundby et al. |
| 2007/0298725 A1 | 12/2007 | Ryu |
| 2008/0188247 A1 | 8/2008 | Worrall |
| 2009/0268624 A1 | 10/2009 | Imamura et al. |
| 2010/0074109 A1 | 3/2010 | Klingenbrunn et al. |
| 2010/0097937 A1 | 4/2010 | Pietraski et al. |
| 2010/0278038 A1 | 11/2010 | Stahle et al. |
| 2011/0038326 A1 | 2/2011 | Davies et al. |
| 2011/0059744 A1 | 3/2011 | Won et al. |
| 2011/0110347 A1 | 5/2011 | Mun |
| 2011/0149728 A1 | 6/2011 | Lee |
| 2011/0190000 A1 | 8/2011 | Kwun |
| 2011/0205886 A1 | 8/2011 | Maruyama et al. |
| 2011/0244877 A1 | 10/2011 | Farajidana et al. |
| 2011/0267854 A1 | 11/2011 | Flannery et al. |
| 2011/0310769 A1 | 12/2011 | Lee et al. |
| 2011/0319065 A1 | 12/2011 | Dalsgaard et al. |
| 2012/0033643 A1 | 2/2012 | Noh et al. |
| 2012/0039252 A1 | 2/2012 | Damnjanovic et al. |
| 2012/0039298 A1 | 2/2012 | Lee et al. |
| 2012/0057479 A1 | 3/2012 | Maruyama et al. |
| 2012/0083283 A1 | 4/2012 | Phan et al. |
| 2012/0093124 A1 | 4/2012 | Zhang et al. |
| 2012/0102240 A1 | 4/2012 | Wei et al. |
| 2012/0106517 A1 | 5/2012 | Charbit et al. |
| 2012/0113844 A1 | 5/2012 | Krishnamurthy |
| 2012/0155406 A1 | 6/2012 | Kim et al. |
| 2012/0176885 A1 | 7/2012 | Lee et al. |
| 2012/0176924 A1 * | 7/2012 | Wu .................. H04W 72/0406 370/252 |
| 2012/0207105 A1 | 8/2012 | Geirhofer et al. |
| 2012/0213057 A1 | 8/2012 | Zhang et al. |
| 2012/0213116 A1 * | 8/2012 | Koo .................. H04B 1/1027 370/253 |
| 2012/0213137 A1 | 8/2012 | Jeong et al. |
| 2012/0218913 A1 | 8/2012 | Park et al. |
| 2012/0220286 A1 | 8/2012 | Chen et al. |
| 2012/0230290 A1 | 9/2012 | Seo et al. |
| 2012/0250662 A1 * | 10/2012 | Kuo .................. H04W 4/20 370/336 |

(56) References Cited

U.S. PATENT DOCUMENTS

| | | |
|---|---|---|
| 2012/0252518 A1 | 10/2012 | Karampatsis et al. |
| 2012/0264483 A1 | 10/2012 | Chin et al. |
| 2012/0320791 A1 | 12/2012 | Guo et al. |
| 2013/0039439 A1 | 2/2013 | Kameya |
| 2013/0051277 A1 | 2/2013 | Hakola et al. |
| 2013/0053024 A1 | 2/2013 | Zou et al. |
| 2013/0080597 A1 | 3/2013 | Liao |
| 2013/0089065 A1 | 4/2013 | Koorapaty et al. |
| 2013/0170467 A1 | 7/2013 | Ogawa et al. |
| 2013/0195070 A1 | 8/2013 | Bashar et al. |
| 2013/0196679 A1 | 8/2013 | Widell et al. |
| 2013/0258874 A1 | 10/2013 | Khoshnevis et al. |
| 2013/0294307 A1 | 11/2013 | Johansson et al. |
| 2013/0295905 A1 | 11/2013 | Islam et al. |
| 2013/0301558 A1 | 11/2013 | Zakrzewski |
| 2013/0303206 A1 | 11/2013 | Starsinic et al. |
| 2013/0329545 A1* | 12/2013 | Wu .................. H04L 1/0025 370/216 |
| 2013/0343252 A1 | 12/2013 | Chakraborty et al. |
| 2014/0016614 A1 | 1/2014 | Velev et al. |
| 2014/0018085 A1 | 1/2014 | Young et al. |
| 2014/0029625 A1 | 1/2014 | Edmiston |
| 2014/0036750 A1 | 2/2014 | Yavuz et al. |
| 2014/0036795 A1 | 2/2014 | Martinez Tarradell et al. |
| 2014/0044029 A1 | 2/2014 | Chou et al. |
| 2014/0086174 A1 | 3/2014 | Nam et al. |
| 2014/0092733 A1 | 4/2014 | Johansson et al. |
| 2014/0094125 A1 | 4/2014 | Behravan et al. |
| 2014/0112194 A1 | 4/2014 | Novlan et al. |
| 2014/0113667 A1 | 4/2014 | Keller et al. |
| 2014/0119261 A1 | 5/2014 | Wang et al. |
| 2014/0120967 A1 | 5/2014 | Purnadi et al. |
| 2014/0269383 A1 | 9/2014 | He et al. |
| 2014/0269779 A1 | 9/2014 | Shan et al. |
| 2014/0286215 A1 | 9/2014 | Koc et al. |
| 2014/0286302 A1 | 9/2014 | Khoryaev et al. |
| 2014/0295856 A1 | 10/2014 | Chou et al. |
| 2014/0321296 A1 | 10/2014 | Balraj |
| 2015/0029874 A1 | 1/2015 | Davydov et al. |
| 2015/0043438 A1 | 2/2015 | Fwu et al. |
| 2015/0092738 A1 | 4/2015 | Chakraborty et al. |
| 2015/0171939 A1 | 6/2015 | Davydov et al. |
| 2015/0215928 A1 | 7/2015 | Davydov et al. |
| 2015/0230179 A1 | 8/2015 | Gupta et al. |
| 2015/0230214 A1 | 8/2015 | Tong et al. |
| 2015/0230234 A1 | 8/2015 | Choi et al. |
| 2015/0237521 A1 | 8/2015 | Davydov et al. |
| 2015/0245221 A1 | 8/2015 | Yiu et al. |
| 2015/0249947 A1 | 9/2015 | Zhang et al. |
| 2015/0304076 A1 | 10/2015 | Lee et al. |
| 2015/0358931 A1 | 12/2015 | Koorapaty et al. |

FOREIGN PATENT DOCUMENTS

| | | |
|---|---|---|
| CN | 104885514 A | 9/2015 |
| CN | 104904137 A | 9/2015 |
| CN | 104904256 A | 9/2015 |
| CN | 104937977 A | 9/2015 |
| CN | 105637917 A | 6/2016 |
| EP | 2154918 A1 | 2/2010 |
| EP | 2369883 A1 | 9/2011 |
| EP | 2915358 A1 | 9/2015 |
| EP | 2915368 A1 | 9/2015 |
| KR | 1020090093758 A | 9/2009 |
| KR | 1020110011145 A | 2/2011 |
| KR | 1020120033283 A | 4/2012 |
| KR | 1020120094369 A | 8/2012 |
| KR | 1020120096408 A | 8/2012 |
| WO | WO-0251189 A1 | 6/2002 |
| WO | WO-2004045083 A2 | 5/2004 |
| WO | WO-2004114683 A2 | 12/2004 |
| WO | WO-2011105726 A2 | 9/2011 |
| WO | WO-2011123550 A1 | 10/2011 |
| WO | WO-2011149533 A1 | 12/2011 |
| WO | WO-2012021879 A2 | 2/2012 |
| WO | WO-2012044328 A1 | 4/2012 |
| WO | WO-2012065033 A1 | 5/2012 |
| WO | WO-2012109989 A1 | 8/2012 |
| WO | WO-2012111937 A2 | 8/2012 |
| WO | WO-2012112281 A2 | 8/2012 |
| WO | WO-2012121757 A1 | 9/2012 |
| WO | WO-2012134579 A1 | 10/2012 |
| WO | WO-2012141884 A1 | 10/2012 |
| WO | WO-2013064385 A1 | 5/2013 |
| WO | WO-2014070321 A1 | 5/2014 |
| WO | WO-2014070347 A1 | 5/2014 |
| WO | WO-2014070359 A1 | 5/2014 |
| WO | WO-2014070410 A1 | 5/2014 |
| WO | WO-2014070411 A1 | 5/2014 |
| WO | WO-2014070480 A1 | 5/2014 |
| WO | WO-2014070602 A1 | 5/2014 |
| WO | WO-2014070649 A1 | 5/2014 |
| WO | WO-2014070768 A1 | 5/2014 |
| WO | WO-2014070778 A1 | 5/2014 |
| WO | WO-2014070901 A1 | 5/2014 |
| WO | WO-2014070929 A1 | 5/2014 |
| WO | WO-2014070933 A1 | 5/2014 |

OTHER PUBLICATIONS

"3GPP TSG-SA5 Meeting #86 Change Request 32.762", New Orleans. S5-123029., (Nov. 12, 2012), 14 pgs.

"U.S. Appl. No. 14/119,228, Non Final Office Action mailed Jun. 19, 2015", 6 pgs.

"U.S. Appl. No. 14/119,228, Notice of Allowance mailed Sep. 29, 2015", 8 pgs.

"U.S. Appl. No. 14/119,228, Preliminary Amendment filed Nov. 21, 2013", 9 pgs.

"U.S. Appl. No. 14/119,228, Response filed Jul. 31, 2015 to Non Final Office Action mailed Jun. 19, 2015", 10 pgs.

"U.S. Appl. No. 14/124,457, Non Final Office Action mailed Jun. 15, 2015", 18 pgs.

"U.S. Appl. No. 14/124,457, Preliminary Amendment filed Dec. 6, 2013", 7 pgs.

"U.S. Appl. No. 14/124,457, Response filed Nov. 11, 2015 to Non Final Office Action mailed Jul. 15, 2015", 11 pgs.

"U.S. Appl. No. 14/124,939, Non Final Office Action mailed Oct. 29, 2015", 31 pgs.

"U.S. Appl. No. 14/124,939, Preliminary Amendment filed Dec. 9, 2013", 9 pgs.

"U.S. Appl. No. 14/124,964, Preliminary Amendment filed Dec. 9, 2013", 9 pgs.

"U.S. Appl. No. 14/125,472, Non Final Office Action mailed Oct. 29, 2015", 11 pgs.

"U.S. Appl. No. 14/125,472, Preliminary Amendment filed Dec. 11, 2013", 9 pgs.

"U.S. Appl. No. 14/125,767, Notice of Allowance mailed Dec. 24, 2015", 15 pgs.

"U.S. Appl. No. 14/125,767, Preliminary Amendment filed Dec. 12, 2013", 11 pgs.

"U.S. Appl. No. 14/126,611, Final Office Action mailed May 22, 2015", 11 pgs.

"U.S. Appl. No. 14/126,611, Non Final Office Action mailed Oct. 23, 2014", 10 pgs.

"U.S. Appl. No. 14/126,611, Notice of Allowance mailed Aug. 19, 2015", 12 pgs.

"U.S. Appl. No. 14/126,611, Preliminary Amendment filed Dec. 16, 2013", 11 pgs.

"U.S. Appl. No. 14/126,611, Response filed Jan. 23, 2015 to Non Final Office Action mailed Oct. 23, 2014", 12 pgs.

"U.S. Appl. No. 14/126,611, Response filed Jul. 24, 2015 to Final Office Action mailed May 22, 2015", 9 pgs.

"U.S. Appl. No. 14/126,654, Examiner Interview Summary mailed Feb. 25, 2013", 5 pgs.

"U.S. Appl. No. 14/126,654, Final Office Action mailed Jun. 18, 2015", 36 pgs.

"U.S. Appl. No. 14/126,654, Non Final Office Action mailed Nov. 6, 2014", 34 pgs.

(56) References Cited

OTHER PUBLICATIONS

"U.S. Appl. No. 14/126,654, Notice of Allowance mailed Sep. 29, 2015", 21 pgs.
"U.S. Appl. No. 14/126,654, Preliminary Amendment filed Dec. 16, 2013", 10 pgs.
"U.S. Appl. No. 14/126,654, Response filed Aug. 28, 2015 to Final Office Action mailed Jun. 18, 2015", 15 pgs.
"U.S. Appl. No. 14/126,654, Response fled Mar. 6, 2015 to Non Final Office Action mailed Nov. 6, 2014", 18 pgs.
"U.S. Appl. No. 14/126,998, Non Final Office Action mailed Sep. 25, 2015", 24 pgs.
"U.S. Appl. No. 14/126,998, Preliminary Amendment filed Dec. 17, 2013", 8 pgs.
"U.S. Appl. No. 14/127,015, Preliminary Amendment filed Dec. 17, 2013", 8 pgs.
"U.S. Appl. No. 14/127,092, Examiner Interview Summary mailed Oct. 9, 2015", 3 pgs.
"U.S. Appl. No. 14/127,092, Non Final Office Action mailed Jul. 6, 2015", 28 pgs.
"U.S. Appl. No. 14/127,092, Preliminary Amendment filed Dec. 17, 2013", 10 pgs.
"U.S. Appl. No. 14/127,092, Response Non Final Office Action mailed Jul. 6, 2015", 11 pgs.
"U.S. Appl. No. 14/127,621, Preliminary Amendment filed Dec. 19, 2013", 8 pgs.
"Chinese Application Serial No. 201380051478.0, Preliminary Amendment filed Oct. 20, 2015", W/ English Claims, 18 pgs.
"Chinese Application Serial No. 201380051593.8, Office Action mailed Jul. 16, 2015", 1 pg.
"CSI Collision Handling for CoMP", R1-123468, 3GPP TSG RAN WG1 #70, Samsung, (Aug. 2012), 3 pgs.
"Discussion on reduction of CSI processing complexity to support CoMP", R1-124368, 3GPP TSG RAN WG1 #70bis, Samsung, (Oct. 2012), 4 pgs.
"Evaluation of MTC Device triggering", HTC, TD S2-110732, 3GPP TSG SA WG2 Meeting #83, (Feb. 2011), 2 pgs.
"Evolved Universal Terrestrial Radio Access (E-UTRA); Radio Resource Control (RRC)", 3GPP TS 36.331 V11.4.0 (Jun. 2013) Technical Specification Group Radio Access Network; Protocol specification (Release 11), (Jun. 2013), 346 pgs.
"Evolved Universal Terrestrial Radio Access (E-UTRA); Radio Resource Control (RRC);", 3GPP TS 36.331 V11.1.0 (Sep. 2012) Technical Specification Group Radio Access Network; Protocol specification (Release 11), (Sep. 2012), 325 pgs.
"Evolved Universal Terrestrial Radio Access (E-UTRA); Study on signalling and procedure for interference avoidance for in-device coexistence", 3GPP TR 36.816 V11.1.0 (Sep. 2011) Technical Specification Group Radio Access Network (Release 11), (Sep. 2011), 44 pgs.
"Inter-RAT mobility for UE under IDC interference", 3GPP TSG-RAN WG2 #79bis; R2-124725; Agenda Item 7.6.3; LG Electronics Inc., (Oct. 8, 2012), 1 pg.
"Inter-RAT operation for in-device coexistence", 3GPP TSG RAN WG2 Meeting #80; R2-125750; Agenda Item 7.6.1; Intel Corporation, (Nov. 12, 2012), 2 pgs.
"International Application Serial No. PCT/US2013/060146, International Preliminary Report on Patentability mailed May 14, 2015", 7 pgs.
"International Application Serial No. PCT/US2013/060146, International Search Report mailed Dec. 27, 2013", 5 pgs.
"International Application Serial No. PCT/US2013/060146, Written Opinion mailed Dec. 27, 2013", 5 pgs.
"International Application Serial No. PCT/US2013/062442, International Preliminary Report on Patentability mailed May 14, 2015", 11 pgs.
"International Application Serial No. PCT/US2013/062442, International Search Report mailed Feb. 18, 2014", 10 pgs.
"International Application Serial No. PCT/US2013/062442, Written Opinion mailed Feb. 18, 2014", 9 pgs.
"International Application Serial No. PCT/US2013/063063, International Preliminary Report on Patentability mailed May 14, 2015", 6 pgs.
"International Application Serial No. PCT/US2013/063063, International Search Report mailed Dec. 31, 2013", 5 pgs.
"International Application Serial No. PCT/US2013/063063, Written Opinion mailed Dec. 31, 2013", 4 pgs.
"International Application Serial No. PCT/US2013/064385, International Preliminary Report on Patentability mailed May 14, 2015", 10 pgs.
"International Application Serial No. PCT/US2013/064385, International Search Report mailed Jan. 29, 2014", 3 pgs.
"International Application Serial No. PCT/US2013/064385, Written Opinion mailed Jan. 29, 2014", 8 pgs.
"International Application Serial No. PCT/US2013/064387, International Preliminary Report on Patentability mailed May 14, 2015", 6 pgs.
"International Application Serial No. PCT/US2013/064387, International Search Report mailed Jan. 28, 2014", 4 pgs.
"International Application Serial No. PCT/US2013/064387, Written Opinion mailed Jan. 28, 2014", 4 pgs.
"International Application Serial No. PCT/US2013/065599, International Preliminary Report on Patentability mailed May 14, 2015", 6 pgs.
"International Application Serial No. PCT/US2013/065599, International Search Report mailed Feb. 10, 2014", 4 pgs.
"International Application Serial No. PCT/US2013/065599, Written Opinion mailed Feb. 10, 2014", 4 pgs.
"International Application Serial No. PCT/US2013/066786, International Preliminary Report on Patentability mailed May 14, 2015", 8 pgs.
"International Application Serial No. PCT/US2013/066786, International Search Report mailed Feb. 12, 2014", 4 pgs.
"International Application Serial No. PCT/US2013/066786, Written Opinion mailed Feb. 12, 2014", 6 pgs.
"International Application Serial No. PCT/US2013/067043, International Preliminary Report on Patentability mailed May 14, 2015", 8 pgs.
"International Application Serial No. PCT/US2013/067043, International Search Report mailed Feb. 25, 2014", 4 pgs.
"International Application Serial No. PCT/US2013/067043, Written Opinion mailed Feb. 25, 2014", 6 pgs.
"International Application Serial No. PCT/US2013/067306, International Preliminary Report on Patentability mailed May 14, 2015", 9 pgs.
"International Application Serial No. PCT/US2013/067306, International Search Report mailed Jan. 17, 2014", 3 pgs.
"International Application Serial No. PCT/US2013/067306, Written Opinion mailed Jan. 17, 2014", 7 pgs.
"International Application Serial No. PCT/US2013/067317, International Preliminary Report on Patentability mailed May 14, 2014", 9 pgs.
"International Application Serial No. PCT/US2013/067317, International Search Report mailed Feb. 7, 2014", 3 pgs.
"International Application Serial No. PCT/US2013/067317, Written Opinion mailed Feb. 7, 2014", 7 pgs.
"International Application Serial No. PCT/US2013/067522, International Preliminary Report on Patentability mailed May 14, 2015", 8 pgs.
"International Application Serial No. PCT/US2013/067522, International Search Report mailed Feb. 12, 2014", 3 pgs.
"International Application Serial No. PCT/US2013/067522, Written Opinion mailed Feb. 12, 2014", 6 pgs.
"International Application Serial No. PCT/US2013/067575, International Preliminary Report on Patentability mailed May 14, 2015", 8 pgs.
"International Application Serial No. PCT/US2013/067575, International Search Report mailed Feb. 21, 2014", 3 pgs.
"International Application Serial No. PCT/US2013/067575, Written Opinion mailed Feb. 21, 2014", 6 pgs.
"International Application Serial No. PCT/US2013/067582, International Preliminary Report on Patentability mailed May 14, 2015", 6 pgs.

(56) References Cited

OTHER PUBLICATIONS

"International Application Serial No. PCT/US2013/067582, International Search Report mailed Nov. 27, 2013", 3 pgs.
"International Application Serial No. PCT/US2013/067582, Written Opinion mailed Nov. 27, 2013", 4 pgs.
"Radio Frequency (RF) requirements for Multicarrier and Multiple Radio Access Technology (Multi-RAT) Base Station (BS)", 3GPP TR 37.900 V11.0.0. Technical Specification Group Radio Access Network. Release 11., (Sep. 24, 2012), 75 pgs.
"Relay System Simulation Results with Coverage Boosting and Control Channel Modeling", 3GPP TSG RAN WG1 Meeting #59, R1-094838, Motorola, (2009), 12 pgs.
"Telecommunication management; Self-Organizing Networks (SON); Self-healing concepts and requirements", 3GPP TS 32.541 V10.0.0. Technical Specification Group Services and System Aspects. Release 10., (Mar. 2011), 21 pgs.
"The Mobile Broadband Standard", 3GPP List of Work Items, [Online] retrieved from the internet: <http://www.3gpp.org/DynaReport/WI-List.html>.
"Title Change Request", 3GPP TSG-RAN WG2 Meeting #79bis; R2-125108, (Oct. 8, 2012), 5 pgs.
"Triggering a detached MTC device", InterDigital Communications, TD S2-110673, 3GPP TSG SA WG2 Meeting #83, (Feb. 2011), 4 pgs.
"TSG-SA5 Meeting #86 Change Request 32.766", New Orleans. S5-123194., (Nov. 12, 2012), 26 pgs.
Doppler, Klaus, et al., "Device-to-Device Communication as an Underlay to LTE-Advanced Networks", IEEE Communications Magazine, 47(12), (Dec. 2009), 42-49.
Hong, Wei, et al., "Considering In-Device Coexistence interference from WiFi point of view", IEEE 802.11-13/0880-00, (Jul. 17, 2013), 13 pgs.
Lei, Lei, et al., "Operator controlled device-to-device communications in LTE-advanced networks", IEEE Wireless Communications, 19(3), (Jun. 2012), 96-104.
"3rd Generation Partnership Project; Technical Specification Group Radio Access Network; Evolved Universal Terrestrial Radio Access (E-UTRA); Study on signalling and procedure for interference avoidance for in-device coexistence (Release 11)", 3GPP Standard; 3GPP TR 36.816, 3rd Generation Partnership Project (3GPP), Mobile Competence Centre ; 650, Route Des Lucioles ; F-06921 Sophia-Antipolis Cedex ; France, vol. RAN WG2, No. V11.2.0,, (Dec. 22, 2011), 1-44.
"U.S. Appl. No. 14/124,939, Final Office Action mailed Jun. 17, 2016", 30 pgs.
"U.S. Appl. No. 14/124,939, Response filed Feb. 29, 2016 to Non Final Office Action mailed Oct. 29, 2015", 15 pgs.
"Chinese Application Serial No. 201380051575.X, Voluntary Amendment mailed Dec. 21, 2015", W/ English Claims, 13 pgs.
"Device Trigger Information", 3gpp Draft; S2-120650, 3rd Generation Partnership Project (3GPP), Mobile Competence Centre ; 650, Route Des Lucioles ; F-06921 Sophia-Antipolis Cedex ; France, vol. Sa Wg2, No. Vancouver, (Jan. 31, 2012).
"European Application Serial No. 13850323.0, Extended European Search Report mailed Jul. 14, 2016", 12 pgs.
"European Application Serial No. 13851603.4, Extended European Search Report mailed Jul. 14, 2016", 11 pgs.
"MTC small data Identification mechanism for non-SMS Small Data Transmission Solution", 3gpp Draft; S2-114341_Mtc_Small_Data_Identification, 3rd Generation Partnership Project (3GPP), Mobile Competence Centre ; 650, Route Des Lucioles ; F-06921 Sophia-Antipolis Cedex ; France, (Oct. 4, 2011).
"Remaining Signaling Issues for the IDC operation", 3GPP Draft; R2-124472-Signaling, 3rd Generation Partnership Project (3GPP), Mobile Competence Centre ; 650, Route Des Lucioles ; F-06921 vol. RAN WG2, No. Bratislava, Slovakia; Oct. 8, 2012-Oct. 12, 2012, [Online] retrieved from the internet:http://www.3gpp.org/ftp/tsg ran/WG2 RL2/TSGR2 79bis/Docs/, (Sep. 28, 2012).
"Triggering procedure over Tsp", 3gpp Draft; S2-120558_Tsp_Trigger_Proc, 3rd Generation Partnership Project (3GPP), Mobile Competence Centre 650, Route Des Lucioles ; F-06921 Sophia-Antipolis Cedex France, vol. Sa Wg2, No. Vancouver, (Jan. 31, 2012).
"Update HSS based device trigger solution", 3GPP TSG SA WG2 Meeting #86: TD S2-113082, (Jul. 15, 2011), 5 pgs.
U.S. Appl. No. 14/119,228, filed Nov. 21, 2013, Inter-RAT Mobility of In-Device Coexistence.
U.S. Appl. No. 14/124,939, filed Dec. 9, 2013, Method and Apparatus for Controlling Small Data Transmission on the Uplink.
U.S. Appl. No. 14/433,815, filed Apr. 6, 2015, PCI Partition and Allocation for Cellular Network.

* cited by examiner

INTER-RAT MOBILITY OF IN-DEVICE COEXISTENCE

PRIORITY APPLICATION

This application is a continuation of U.S. application Ser. No. 14/119,228, filed Nov. 21, 2013, which is a U.S. National Stage Application filed under 35 U.S.C. §371 of International Application No. PCT/US2013/067306, filed Oct. 29, 2013, published as WO 2014/070768, which claims the benefit of priority to U.S. Provisional Patent Application Ser. No. 61/721,436, filed Nov. 1, 2012, which applications are incorporated herein by reference in their entireties.

TECHNICAL FIELD

Embodiments pertain to operations and communications performed by electronic devices in wireless networks. Some embodiments relate to operations for coordinating wireless network communications and connections to avoid coexistence interference occurring among respective wireless networks.

BACKGROUND

Next generation mobile networks, such as 3GPP Long Term Evolution (LTE)/Long Term Evolution-Advanced (LTE-A) networks, are commonly deployed in a multi-radio environment where a mobile station device, referred to as User Equipment (UE) in LTE/LTE-A, is equipped with multiple radio transceivers. Use of these multiple co-located transceivers by a UE may lead to coexistence interference among networks utilizing nearby frequency bands.

Existing 3GPP LTE/LTE-A standards have proposed limited techniques to identify coexistence interference among multiple wireless radios. When a UE is connected to a Universal Terrestrial Radio Access Network (UTRAN) or GSM/EDGE Radio Access Network (GERAN), the UE may perform an inter-Radio Access Technology (inter-RAT) measurement for connection with an Evolved Universal Terrestrial Radio Access Network (E-UTRAN), such as an LTE/LTE-A network, to determine if the E-UTRAN frequencies currently experience In-Device Coexistence (IDC) interference. However, the UTRAN/GERAN does not know whether the UE may encounter other additional IDC interference problems until after the UE connects to the E-UTRAN. This may result in the UTRAN/GERAN performing a handover of UEs to an E-UTRAN followed by coexistence interference with the E-UTRAN. If coexistence interference occurs and the E-UTRAN does not support a Time Division Multiplexing (TDM) solution to prevent the coexistence interference, the network will handover the UE back to the UTRAN/GERAN. Such network switching results in unnecessary signaling overhead.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The following describes example system and device implementations and techniques to support inter-RAT mobility and in-device coexistence (IDC) interference measurements for handover operations between a UTRAN/GERAN and an E-UTRAN. These implementations include: a UE/mobile device-based technique that avoids handover to an E-UTRAN using pessimistic signal measurement results; a network-based technique that tracks whether a UE/mobile device is experiencing or has recently experienced a coexistence problem, to avoid handover to the E-UTRAN; and an indication message-based technique that provides signaling of an IDC interference condition from a UE to a UTRAN/GERAN network, to avoid handover to the E-UTRAN.

Figure 1:
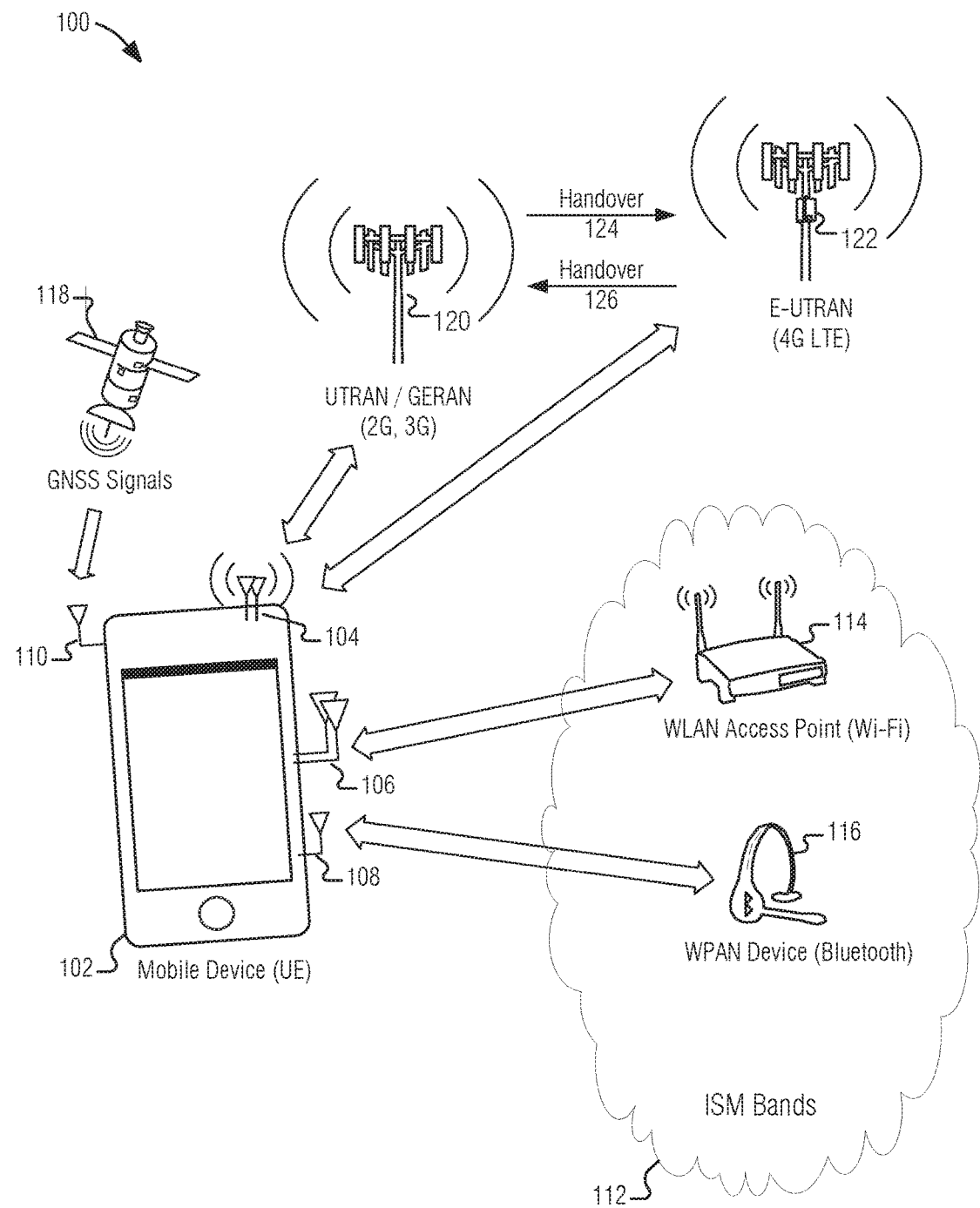
FIG. 1 illustrates an example communication environment for management of inter-radio access technology mobility for in-device coexistence interference according to a described example.

FIG. 1 provides an illustration of an example operating environment 100 for UE 102 in which IDC interference may occur at a mobile device from radio communications from industrial, scientific and medical (ISM) frequency bands 112. For example, the UE 102 may be equipped with a transceiver 104 configured for communication with an E-UTRAN 122 (e.g., a 4G LTE/LTE-A network), a Wireless Local Area Network (WLAN) transceiver 106 (e.g., a IEEE 802.11 Wi-Fi transceiver) configured for communication with a WLAN Access Point 114, a Wireless Personal Area Network (WPAN) transceiver 108 (e.g., a Bluetooth transceiver) configured for communication with a WPAN Device 116 (e.g., a Bluetooth headset), in addition to a satellite communication receiver 110 (e.g., a Global Positioning System (GPS)/Global Navigation Satellite System (GNSS) receiver) configured for receipt of satellite communication signals.

IDC interference among communications with the E-UTRAN 122 and the ISM Bands 112 may occur due to the proximity of LTE frequency bands with unlicensed ISM frequencies used for WLAN, WPAN, and GNSS communications. For example, radio transmissions in LTE Band 40 (2300~2400 MHz) or LTE Band 7 Uplink (2500~2570 MHz) may cause interference with the standard operation range of 2.4 GHz ISM bands (2400~2483.5 MHz), and ISM radio transmissions in the 2.4 GHz ISM bands may cause interference with reception in LTE Band 40. In addition, transmissions in LTE Bands 7 (2500~2570 MHz), LTE Band 13 Uplink (777~787 MHz), and LTE Band 14 Uplink (788~798 MHz) may cause interference with GNSS radio reception of various global satellite communications in nearby and co-located frequency bands. Other conflicts of LTE frequency bands with other regulated/licensed and unlicensed radio frequency bands may occur in a similar fashion.

If IDC interference with the LTE frequency bands communicated by the E-UTRAN 122 is detected at the UE 102, the UE 102 will report assistance information to indicate that there is an IDC interference problem. In response, the E-UTRAN may take action to reduce or resolve the IDC interference problem, such as implementing a time division multiplexing (TDM) solution, performing a handover of the UE to another frequency band, or performing a handover of the UE to another radio access network. As shown in FIG. 1, the transceiver 104 is also configured for communication with a UTRAN (e.g., a 3G UMTS) or GERAN (e.g., a 2G GSM EDGE) radio access network. (In other examples, a separate transceiver may be used to receive and transmit LTE EUTRA radio communications separately from the UMTS/GSM EDGE radio communications; likewise, separate antennas may be used to facilitate the separate radio communications). A connection established between the UE 102 and the UTRAN/GERAN 120 may be transferred to the E-UTRAN 122 with use of a handover 124. Although the UE may prefer the connection with the E-UTRAN 122, if IDC interference occurs at the UE 102 while connected to the E-UTRAN 122, the E-UTRAN 122 may facilitate a transfer to the UTRAN/GERAN with a handover 126.

Figure 2:
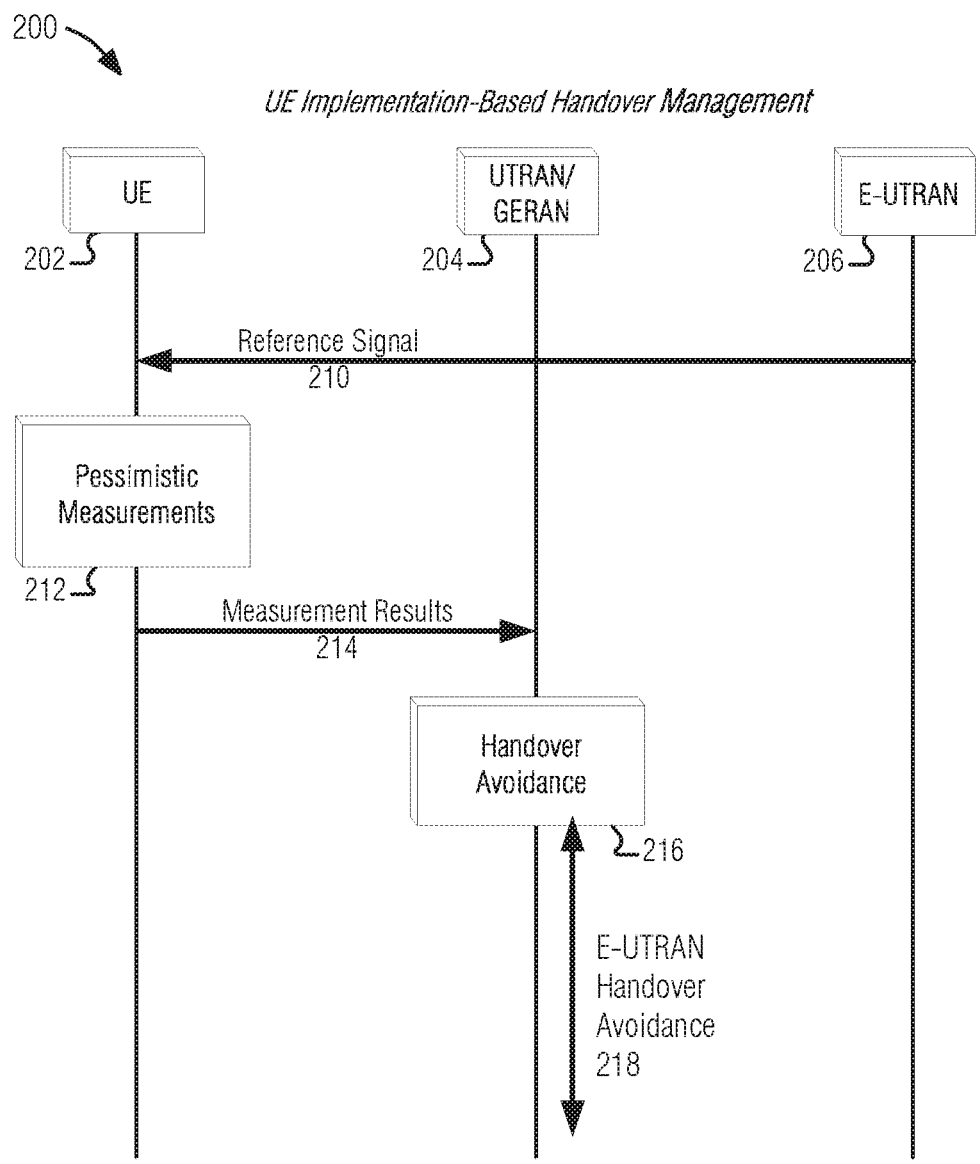
FIG. 2 illustrates an example user equipment implementation of handover management for inter-radio access technology mobility in coexistence interference settings according to a further described example.

To ensure proper handover management within different radio access networks, such as from a UTRAN/GERAN to an E-UTRAN, a UE implementation of handover management may be designed to prevent handovers from a UTRAN/GERAN network that would result in IDC interference. In one example, a UE provides pessimistic signal quality measurements of the E-UTRAN to effectively prevent handover to an E-UTRAN where IDC interference would occur. FIG. 2 illustrates example network implementation operations 200 of handover management for inter-RAT mobility in coexistence interference settings (such as the UE IDC interference settings illustrated in FIG. 1) that prevent handover of a UE 202 from a UTRAN/GERAN 204 to an E-UTRAN 206.

In the example operations depicted in FIG. 2, the UE 202 is configured to obtain a reference signal 210 from an E-UTRAN 206 in order to determine the signal quality of the E-UTRAN 206 and whether to perform a handover. Because there are no requirements on time domain sampling for LTE measurements and because the interference from ISM bands might be bursty (and can occur infrequently), normal inter-RAT measurements of interference might not reflect an accurate reflection of in-device interference. Accordingly, the UE 202 is configured to report measurement results 214 to the UTRAN/GERAN 204 determined from pessimistic measurements 212 of the reference signal 210. The values in the measurement results 214 may be communicated in a Reference Signal Received Quality (RSRQ) value. Accordingly, the UE 202 can delay or prevent handover by artificially reporting such pessimistic measurement results of the E-UTRAN 206, by reporting values lower than the actual measurement results. In response to receiving such measurements, the UTRAN/GERAN 204 will avoid performing a handover 216, and continue to avoid or deny a handover 218 of the UE 202 to E-UTRAN 204 for at least a period of time when interference might occur.

Figure 3:
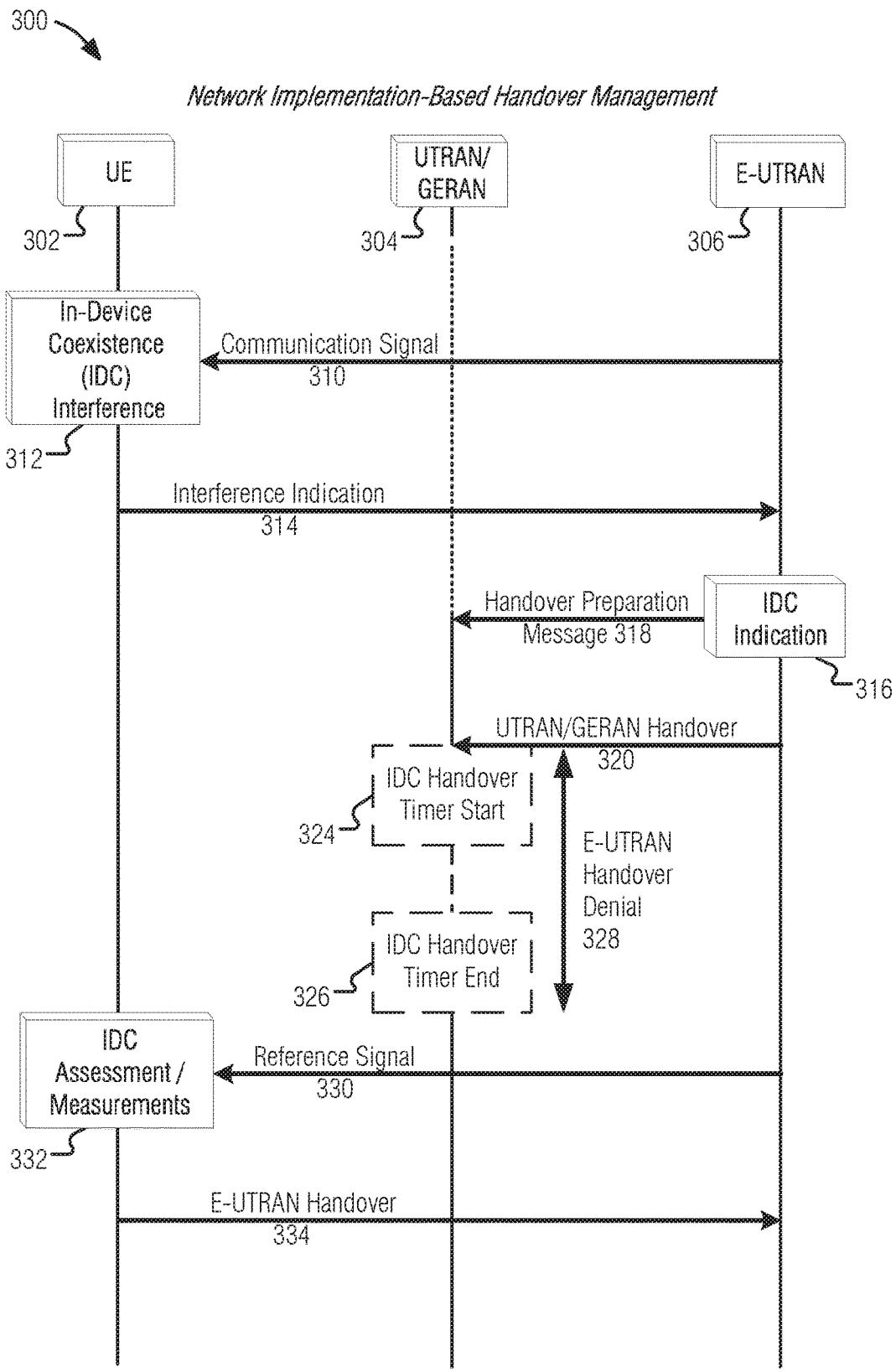
FIG. 3 illustrates an example network implementation of handover management for inter-radio access technology mobility in coexistence interference settings according to a further described example.

In another example, a network implementation of handover management may be designed to track whether a UE is experiencing an in-device coexistence problem. FIG. 3 illustrates example network implementation operations 300 of handover management for inter-RAT mobility in coexistence interference settings (such as the UE IDC interference settings illustrated in FIG. 1) to prevent premature initiation of a handover of a UE 302 from a UTRAN/GERAN 304 to an E-UTRAN 306.

In this implementation, the radio access networks track whether the UE 302 is experiencing an in-device coexistence problem. In accordance with UE-implemented techniques for detecting and handling IDC interference, if IDC interference 312 is experienced at the UE 302 with a LTE communication signal 310, the UE 302 will communicate an indication of the interference 314, which can result in the network deciding to perform a handover to move the UE from the E-UTRAN 306 to the UTRAN/GERAN 304.

Before the UE 302 is moved from the E-UTRAN 306 to the UTRAN/GERAN 304 with handover operation 320, the source evolved NodeB (eNB) in the E-UTRAN 306 sends a message for handover preparation to the UTRAN/GERAN 304. In this message, the source eNB can include an IDC indication 316 that indicates the cause of handover is from an in-device coexistence problem. For example, the IDC indication 316 may be provided by adding one bit in a handover preparation message 318 to designate the handover as caused from IDC interference. With the information from the IDC indication 316, the UTRAN/GERAN 304 then knows that the UE 304 has an in-device coexistence problem and can employ measures to prevent an unnecessary handover back to the E-UTRAN.

The UTRAN/E-UTRAN 304 will avoid performing a handover of the UE 302 back to the E-UTRAN 306 and deny the handover 328 to the E-UTRAN 306. In a further example, E-UTRAN frequencies experiencing the in-device coexistence problems can also be indicated in the handover preparation message 318, to allow handover to occur but not to the potentially problematic frequencies. For example, the UE 302 may choose to not perform measurements for LTE frequencies having potential in-device coexistence problems. In addition, when the UE 302 is handed over within the UTRAN/GERAN 304, handover preparation messages between UTRAN/GERAN nodes can include an indication that UE might have an in-device coexistence problem, and include a list of E-UTRAN frequencies having potential in-device coexistence problems.

In a further example depicted in FIG. 3, the UTRAN/GERAN 304 may maintain a timer to track how much time has elapsed since the UE 302 was handed over from the LTE network. This is shown with the start of the Handover Timer 324 and the end of the Handover Timer 326, during which the UTRAN/GERAN 304 will deny the handover 328 to the E-UTRAN 306. If the timer expires or meets a defined value, the UTRAN/GERAN 304 can allow the UE 302 to conduct a handover back to the LTE network, for example, by configuring UE to perform measurements for E-UTRAN frequencies having in-device coexistence problems and verify that interference is not being experienced with a reference signal 330 based on an IDC assessment/measurements 332 at the UE 302. When a handover of the UE 302 to the E-UTRAN 306 is prepared within the UTRAN/GERAN 304, handover preparation messages between UTRAN/GERAN nodes can also include the current value of the timer, to enable time tracking to continue after handover to the E-UTRAN 334. In other examples, other time-based tracking techniques (e.g., a timestamp of the last interference event) may be used in place of a timer. The handover preparation messages between UTRAN/GERAN nodes may also include the indication that UE might have an in-device coexistence problem, may also include a list of one or more E-UTRAN frequencies known to experience in-device coexistence problems.

Figure 4:
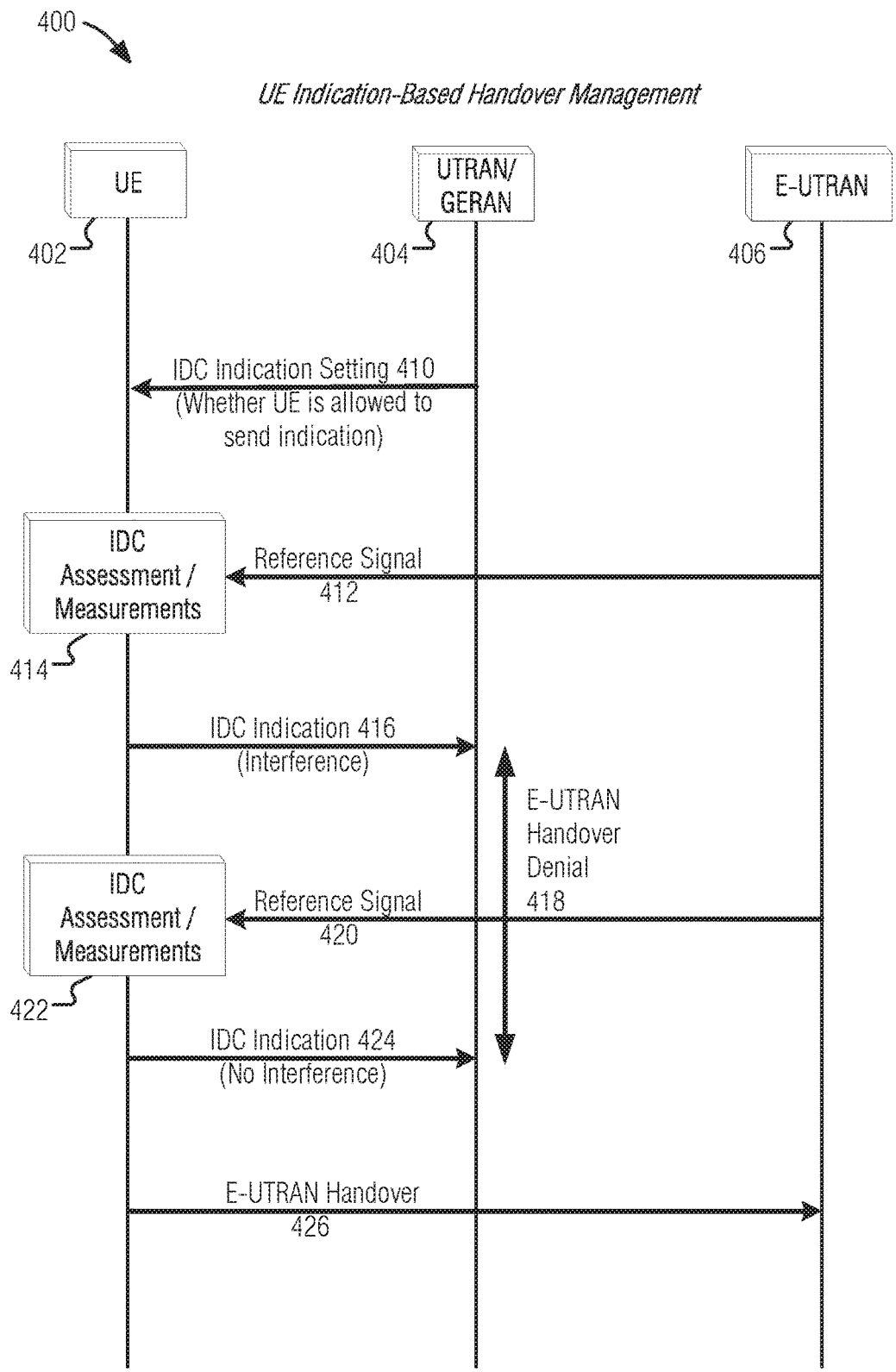
FIG. 4 illustrates an example message-based implementation of handover management for inter-radio access technology mobility in coexistence interference settings according to a further described example.

In another example, handover management may be directly controlled as a result of a UE interference indication message that communicates whether the UE is experiencing an in-device coexistence problem. This UE indication may be provided in response to an IDC indication setting maintained by the network and communicated to the UE, which controls whether the UE is allowed to send the indication message. FIG. 4 illustrates example network implementation operations 400 of handover management for inter-RAT mobility in coexistence interference settings (such as the UE IDC interference settings illustrated in FIG. 1) that communicate the existence of IDC interference for an E-UTRAN 406 from a UE 402 to a UTRAN/GERAN 404.

As shown in FIG. 4, an IDC indication setting 410 may be communicated from the UTRAN/GERAN 404 to the UE 402. In some examples, a UE 402 that supports IDC indication functionality may indicate this capability to the UTRAN/GERAN 404 prior to receiving the IDC indication setting 410. Accordingly, the UTRAN/GERAN 404 may control whether the UE is allowed to send an IDC indication (with IDC indication setting 410).

While connected to the UTRAN/GERAN 404, the UE 402 may determine that IDC interference would occur at the UE 402 between E-UTRAN communications and other radio communications, based on an IDC assessment and measurements 414 performed upon a reference signal 412 received from the E-UTRAN 406. When the UE 402 detects a level of IDC interference with E-UTRAN communications that cannot be solved by the UE 402 itself, the UE 402 can then produce an IDC indication 416, which is communicated to the UTRAN/GERAN 404 to report the determined interference problems. The IDC indication 416 may be sent via dedicated RRC signaling to the UTRAN/GERAN 404. In response to the IDC indication 416 that indicates interference, the UTRAN/GERAN 404 will avoid a handover 418 to the E-UTRAN 406.

An example of an IDC interference indication (e.g., communicated with the IDC indication 416) includes a message with a defined data structure to include the list of E-UTRAN frequencies that may be affected by the present IDC problems. For example, the IDC indication data structure may include data values that define a list of E-UTRA carrier frequencies affected by IDC problems and a data value to indicate the direction of IDC interference. The direction of the IDC interface may be indicated by: a value eutra to indicate that only the E-UTRA radio is victim of IDC interference; a value other to indicate that only another radio is victim of IDC interference; or a value both to indicate that both the E-UTRA radio and another radio are victims of IDC interference. (The another radio may refer to an ISM radio or a GNSS receiver, for example).

The condition to avoid the handover 418 may occur for a period of time, or until interference conditions change. For example, the E-UTRAN 406 may provide a subsequent reference signal 420 that can be analyzed with another IDC assessment and measurements 422. The results of the IDC assessment and measurements 422 may be provided in an IDC indication 424 that indicates that interference is not present. For example, the IDC indication 424 may be configured to include a blank carrier frequency list to inform the UTRAN/GERAN 404 that the IDC interference is not present or has ceased. Based on the IDC indication 424 of no interference, an E-UTRAN handover 426 may proceed.

One benefit of providing a UE indication (such as IDC indication 416, IDC indication 424) is that the involved radio access networks will obtain full information of the in-device interference situation and accurate inter-RAT measurement results. Based on this information, the radio access networks can decide whether to perform (or avoid/deny) inter-RAT handover based on factors such as load balancing, measurement results, or other information.

In further examples, techniques may be performed at the UE 402 to ensure that the UE measurements and assessments (e.g., assessments 414, 422) are properly performed for inter-RAT measurement of E-UTRAN frequencies. For example, the assessment may be assisted by having the UE 402 delay or avoid any ISM transmissions when the UE 402 is performing interference measurements.

Figure 5:
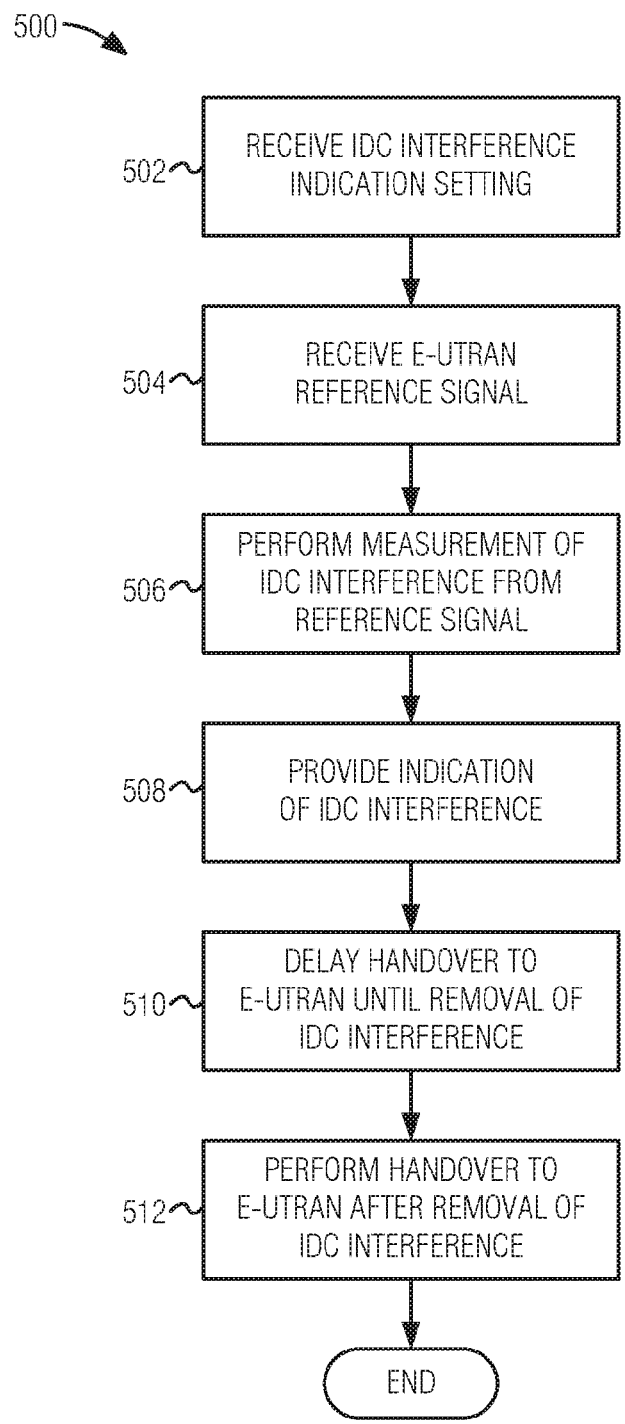
FIG. 5 illustrates a flowchart of an example flow of coexistence interference indication messaging operations performed by a user equipment device according to a further described example.

FIG. 5 provides an example illustration of an operation flow 500 performed at a wireless device (e.g., a UE) for providing a coexistence interference indication. It will be understood that the operation flow 500 provides a general outline of a sequence of operations conducted at an example client-side device, but some of the operations may be conducted in different order, substituted or replaced by other operations (including operations performed in connection with human interaction or remote instruction), or removed from the flow.

In operation 502, the UE receives an indication setting that controls whether to communicate an IDC interference indication back to the network. This indication setting may be provided from the UTRAN/GERAN to indicate whether the UTRAN/GERAN network supports processing as a result of IDC interference. In some examples, use of the indication setting is optional and the UE is configured to provide the IDC interference indication independent of any network setting.

In operation 504, the UE receives an E-UTRAN reference signal. Using this reference signal, the UE performs a measurement of IDC interference in operation 506. In operation 508, the UE can respond by communicating an indication of the existence, amount, and type of IDC interference. Accordingly, in operation 510, the GERAN/UTRAN can respond to the measurement of IDC interference by delaying a handover to the E-UTRAN until the removal of the IDC interference. The removal of the IDC interference may be determined from subsequent measurements and verifications of IDC interference, from the expiration of a timer, or from network changes. Ultimately, in operation 512, the handover to the E-UTRAN can be performed after removal of the IDC interference.

Figure 6:
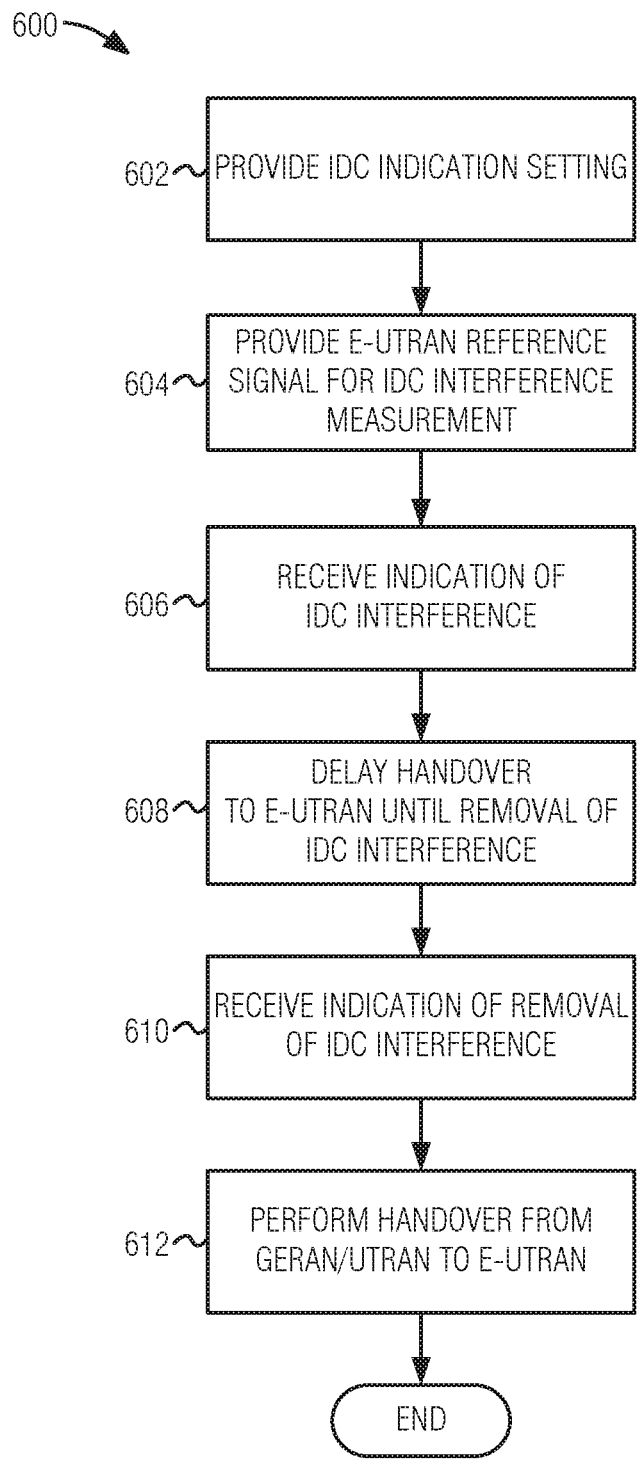
FIG. 6 illustrates a flowchart of an example flow of coexistence interference indication messaging operations performed by a wireless network according to a further described example.

FIG. 6 provides an example illustration of an operation flow 600 performed at elements of the radio access network(s) (e.g., the E-UTRAN, UTRAN, GERAN) for responding to a coexistence interference indication and managing handover to the E-UTRAN. It will be understood that the operation flow 600 provides a general outline of a sequence of operations conducted by the radio access network as a whole, but some of the operations may be conducted in different order, substituted or replaced by other operations, removed from the flow, or performed in connection with distributed elements or a specific actor/component within the radio access network.

In operation 602, the network transmits an indication setting to control whether the UE is allowed to communicate an IDC interference indication back to the network. This indication setting may be provided from the UTRAN/GERAN, for example, to indicate whether the UTRAN/GERAN supports specialized processing for E-UTRAN handovers as a result of IDC interference. In other examples, communication of the indication setting is optional, and the network is automatically configured to monitor for an IDC interference indication.

In operation 604, the E-UTRAN provides a reference signal to the UE that can be used to perform an assessment and measurement of IDC interference. This reference signal may be provided at a defined interval or upon command by other aspects of the radio access network. In operation 606, the radio access network receives an indication of the IDC interference that is occurring or may prospectively occur at the UE. This indication may include an indication of which radios at the UE is experiencing interference, which direction (reception or transmission at the UE) is experiencing interference, or which specific frequencies or frequency bands are encountering interference. As a result of this indication of interference, steps can be taken at the radio access network to prevent further interference at the UE and improper handovers. For example, as indicated in operation 608, the radio access network may delay handover of the UE to the E-UTRAN until the removal or reduction of the IDC interference.

In operation 610, the radio access network receives an indication of the removal of IDC interference. This may be provided from an indication that certain frequency bands (or all frequency bands) are not experiencing IDC interference at the UE. In other examples, the indication may be determined based on the expiration of a defined time, or a timer which reaches a defined value. Once the potential for interference is determined to be reduced or eliminated, the handover of the UE may be performed within the radio access networks, for example, with a handover of the UE from the GERAN/UTRAN to E-UTRAN as in operation 612.

Although the preceding examples of wireless network connections were provided with specific reference to 3GPP LTE/LTE-A, IEEE 802.11, and Bluetooth communication standards, it will be understood that a variety of other WWAN, WLAN, and WPAN protocols and standards may be used in connection with the techniques described herein. These standards include, but are not limited to, other standards from 3GPP (e.g., HSPA+, UMTS), IEEE 802.16 (e.g., 802.16p), or Bluetooth (e.g., Bluetooth 4.0, or like standards defined by the Bluetooth Special Interest Group) standards families. Other applicable network configurations may be included within the scope of the presently described communication networks. It will be understood that communications on such communication networks may be facilitated using any number of personal area networks, LANs, and WANs, using any combination of wired or wireless transmission mediums.

The embodiments described above may be implemented in one or a combination of hardware, firmware, and software. Various methods or techniques, or certain aspects or portions thereof, may take the form of program code (i.e., instructions) embodied in tangible media, such as flash memory, hard drives, portable storage devices, read-only memory (ROM), random-access memory (RAM), semiconductor memory devices (e.g., Electrically Programmable Read-Only Memory (EPROM), Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

A machine-readable storage medium or other storage device may include any non-transitory mechanism for storing information in a form readable by a machine (e.g., a computer). In the case of program code executing on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 7:
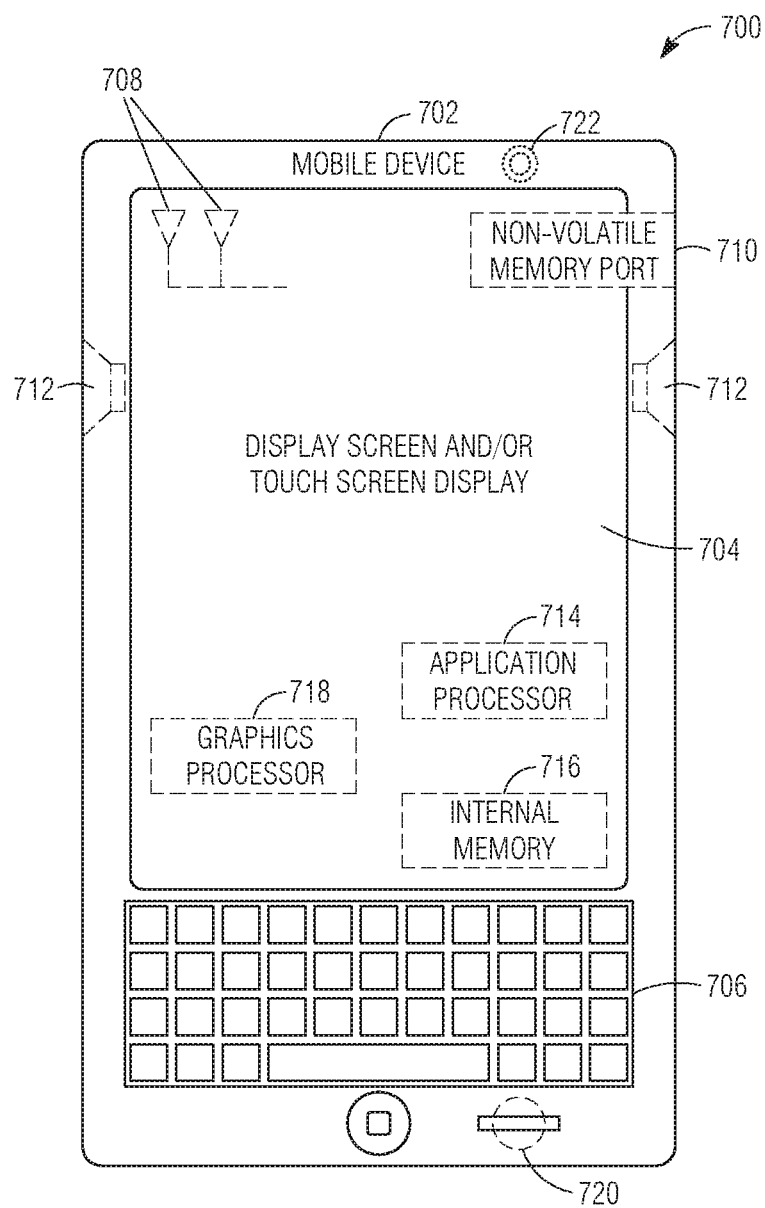
FIG. 7 illustrates an example mobile client device on which the configurations and techniques described herein may be deployed.

FIG. 7 provides an example illustration of a mobile device 700, such as a user equipment (UE), a mobile station (MS), a mobile wireless device, a mobile communication device, a tablet, a handset, or other type of mobile wireless computing device. The mobile device 700 may include one or more antennas 708 within housing 702 that are configured to communicate with a hotspot, base station (BS), an evolved NodeB (eNodeB), or other type of WLAN or WWAN access point. The mobile device may be configured to communicate using multiple wireless communication standards, including standards selected from 3GPP LTE, WiMAX, High Speed Packet Access (HSPA), Bluetooth, and Wi-Fi standard definitions. The mobile device 700 may communicate using separate antennas for each wireless communication standard or shared antennas for multiple wireless communication standards. The mobile device 700 may communicate in a WLAN, a WPAN, and/or a WWAN.

FIG. 7 also provides an illustration of a microphone 720 and one or more speakers 712 that may be used for audio input and output from the mobile device 700. A display screen 704 may be a liquid crystal display (LCD) screen, or other type of display screen such as an organic light emitting diode (OLED) display. The display screen 704 may be configured as a touch screen. The touch screen may use capacitive, resistive, or another type of touch screen technology. An application processor 714 and a graphics processor 718 may be coupled to internal memory 716 to provide processing and display capabilities. A non-volatile memory port 710 may also be used to provide data input/output options to a user. The non-volatile memory port 710 may also be used to expand the memory capabilities of the mobile device 700. A keyboard 706 may be integrated with the mobile device 700 or wirelessly connected to the mobile device 700 to provide additional user input. A virtual keyboard may also be provided using the touch screen. A camera 722 located on the front (display screen) side or the rear side of the mobile device 700 may also be integrated into the housing 702 of the mobile device 700.

Figure 8:
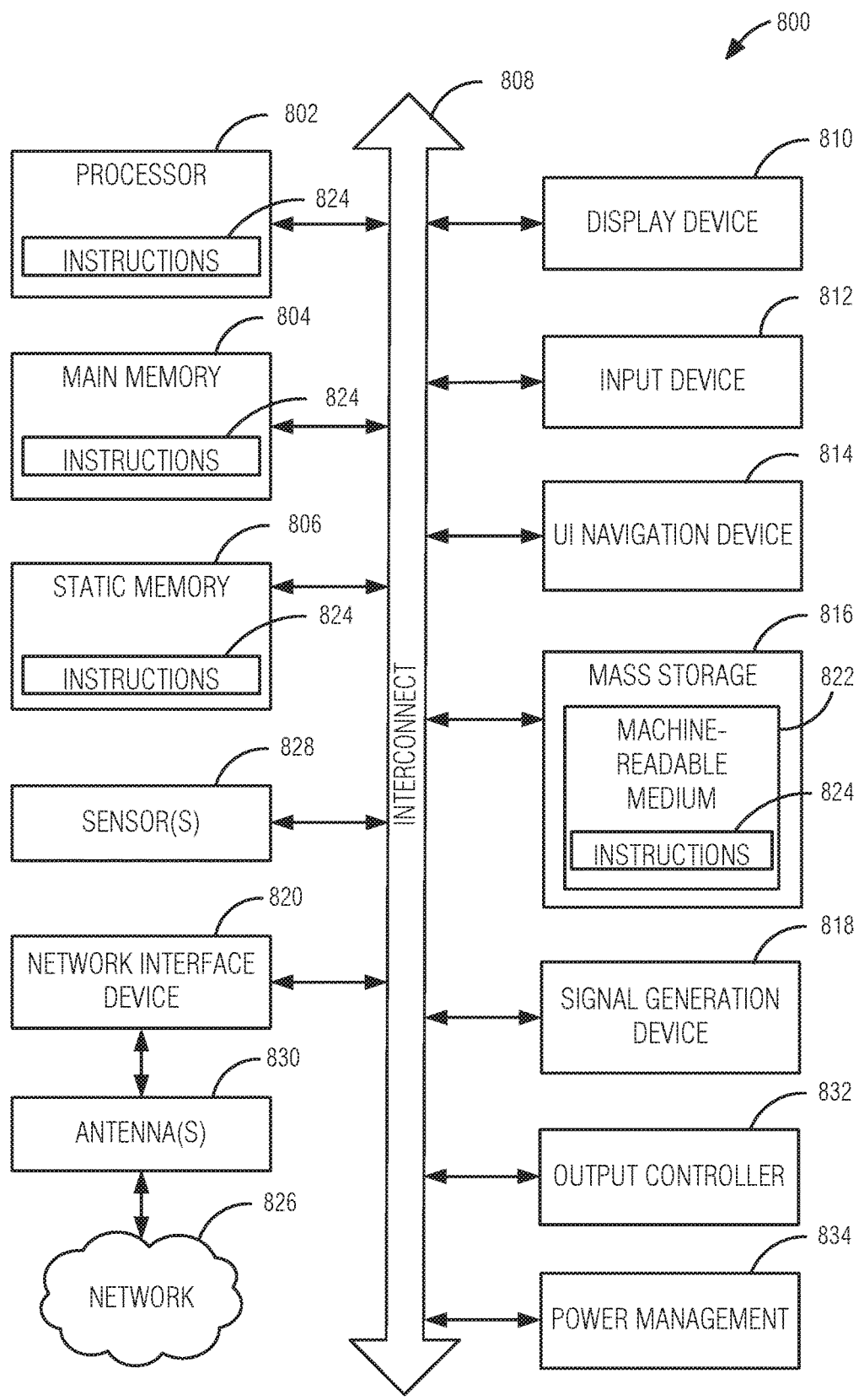
FIG. 8 illustrates an example computer system that may be used as a computing platform for the computing or networking devices described herein.

FIG. 8 is a block diagram illustrating an example computer system machine upon which any one or more of the methodologies herein discussed may be run. Computer system machine 800 may be embodied as the mobile device 106A, computing system 106B, access point 104, servers 112, 114, 122, 124, 126, 128, mobile device 302, access point 306, server 308, mobile device 700, or any other computing platform described or referred to herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system machine 800 includes a processor 802 (e.g., a central processing unit (CPU), a graphics processing unit (GPU) or both), a main memory 804 and a static memory 806, which communicate with each other via an interconnect 808 (e.g., a link, a bus, etc.). The computer system machine 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are a touch screen display. The computer system machine 800 may additionally include a storage device 816 (e.g., a drive unit), a signal generation device 818 (e.g., a speaker), an output controller 832, a power management controller 834, and a network interface device 820 (which may include or operably communicate with one or more antennas 830, transceivers, or other wireless communications hardware), and one or more sensors 828, such as a Global Positioning Sensor (GPS) sensor, compass, location sensor, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system machine 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The instructions 824 may further be transmitted or received over a communications network 826 using a transmission medium via the network interface device 820 utilizing any one of a number of well-known transfer protocols (e.g., HTTP). The term "transmission medium" shall be taken to include any intangible medium that is capable of storing, encoding, or carrying instructions for execution by the machine, and includes digital or analog communications signals or other intangible medium to facilitate communication of such software.

It should be understood that the functional units or capabilities described in this specification may have been referred to or labeled as components or modules, in order to more particularly emphasize their implementation independence. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 includes the subject matter embodied by a method performed by a device (e.g., a user equipment (UE), wireless computing device) for management of evolved UMTS Terrestrial Radio Access Network (E-UTRAN) handover in response to in-device coexistence (IDC) interference occurring at the UE, with operations including: performing measurements, at the UE, to determine IDC interference occurring with radio communications of the E-UTRAN; and transmitting an indication of the IDC interference to a radio access network; wherein handover of the UE is avoided from a UMTS Terrestrial Radio Access Network (UTRAN) or a GSM EDGE Radio Access Network (GERAN) to the E-UTRAN, such that the UTRAN or GERAN refrains from performing a handover from the UTRAN or the GERAN to the E-UTRAN in response to the indication of the IDC interference.

In Example 2, the subject matter of Example 1 can optionally include receiving an IDC indication setting from the UTRAN or the GERAN, the IDC indication setting provided to instruct the UE to transmit the indication of the IDC interference to the UTRAN or the GERAN.

In Example 3, the subject matter of one or any combination of Examples 1-2 can optionally include the indication of the IDC interference being transmitted by the UE in response to the IDC indication setting that instructs the UE to transmit the indication of the IDC interference to the UTRAN or the GERAN.

In Example 4, the subject matter of one or any combination of Examples 1-3 can optionally include the indication of the IDC interference including: a listing of one or more E-UTRAN carrier frequencies affected by the IDC interference, and a direction of the IDC interference.

In Example 5, the subject matter of one or any combination of Examples 1-4 can optionally include the indication of the IDC interference being transmitted to the UTRAN or the GERAN, the method including: performing subsequent measurements, at the UE, to determine a lack of IDC interference occurring with radio communications of the E-UTRAN; and transmitting a subsequent indication of an absence of the IDC interference to the UTRAN or the GERAN; wherein handover of the UE is performed from the UTRAN or the GERAN to the E-UTRAN in response to the subsequent indication of the absence of the IDC interference.

In Example 6, the subject matter of one or any combination of Examples 1-5 can optionally include the E-UTRAN indicating that a cause of the handover is from the IDC interference by adding a bit in a handover preparation message, wherein the handover preparation message includes a listing of one or more E-UTRAN carrier frequencies affected by the IDC interference.

In Example 7, the subject matter of one or any combination of Examples 1-6 can optionally include the UE coordinating with a network implementation of the handover management to prevent handover, wherein the network implementation of the handover management includes receipt of a handover preparation message at the UTRAN or the GERAN from the E-UTRAN indicating the IDC interference, and use of a timer at the UTRAN or the GERAN to avoid handover of the UE to the E-UTRAN for a period of time.

In Example 8, the subject matter of one or any combination of Examples 1-7 can optionally include one or more handover preparation messages exchanged between UTRAN or GERAN nodes including an indication that the UE is affected by the IDC interference, wherein the handover preparation messages exchanged between the UTRAN or GERAN nodes include a listing of one or more E-UTRAN carrier frequencies affected by the IDC interference.

In Example 9, the subject matter of one or any combination of Examples 1-8 can optionally include the UE performing a UE implementation of the handover management to prevent handover, wherein the UE implementation of the handover management includes receipt and processing by the UE of a reference signal received from the E-UTRAN, and communication of pessimistic measurements of the reference signal received from the E-UTRAN; and wherein the indication of the IDC interference includes the pessimistic measurements, and wherein handover to the E-UTRAN is avoided from the UTRAN or the GERAN in response to the pessimistic measurements.

In Example 10, the subject matter of one or any combination of Examples 1-9 can optionally include the IDC interference being caused by interference of a Long Term Evolution (LTE) radio of the UE, with a wireless local area network (WLAN), a wireless personal area network (WPAN) radio, or a Global Navigation Satellite System (GNSS) radio of the UE.

In Example 11, the subject matter of one or any combination of Examples 1-10 can optionally include the IDC interference occurring: between radio transmissions of LTE Band 40 and a 2.4 GHz industrial scientific medical (ISM) frequency band, between radio transmissions of LTE Band 7 and the 2.4 GHz ISM frequency band, between radio transmissions of 2.4 GHz ISM bands and LTE Band 40, or between radio transmissions of LTE Band 7, LTE Band 13, or LTE Band 14 and reception of the GNSS radio.

Example 12 can include, or can optionally be combined with all or portions of the subject matter of one or any combination of Examples 1-8 to include the subject matter embodied by a wireless communication device such as a user equipment (UE), comprising: circuitry arranged to perform radio communications in an industrial, scientific and medical (ISM) radio frequency band; and circuitry arranged to perform radio communications with an UMTS Terrestrial Radio Access Network (UTRAN) or GSM EDGE Radio Access Network (GERAN) and an evolved UMTS Terrestrial Radio Access Network (E-UTRAN), the circuitry further arranged to facilitate handover management of the UE between the E-UTRAN and the UTRAN or GERAN network, with operations to: measure IDC interference occurring between radio communications of the E-UTRAN and the radio communications in the ISM radio frequency band; and transmit an indication of the IDC interference to the UTRAN or the GERAN; wherein handover of the UE from a UMTS Terrestrial Radio Access Network (UTRAN) or GSM EDGE Radio Access Network (GERAN) to the E-UTRAN is avoided in response to the indication of the IDC interference.

In Example 13, the subject matter of Example 12 can optionally include the circuitry arranged to perform radio communications with the UTRAN or GERAN and the E-UTRAN being further arranged to respond to an IDC indication setting received from the UTRAN or the GERAN, by processing the IDC indication setting to instruct the UE to transmit the indication of the IDC interference to the UTRAN or the GERAN.

In Example 14, the subject matter of one or any combination of Examples 12-13 can optionally include the circuitry arranged to perform radio communications with the UTRAN or GERAN and the E-UTRAN being further arranged to: perform subsequent measurements, at the UE, to determine a lack of IDC interference occurring with the E-UTRAN; and transmit a subsequent indication of an absence of the IDC interference to the UTRAN or GERAN, in response to the determination of the lack of IDC interference occurring with the E-UTRAN; wherein handover of the UE to the E-UTRAN is performed from the UTRAN or GERAN in response to the subsequent indication of the absence of the IDC interference.

In Example 15, the subject matter of one or any combination of Examples 12-14 can optionally include the circuitry arranged to perform radio communications with the UTRAN or GERAN and the E-UTRAN being further arranged to coordinate with a network implementation of the handover management to prevent handover, wherein the network implementation of the handover management includes receipt of a handover preparation message at the UTRAN or GERAN from the E-UTRAN indicating the IDC interference, and use of a timer at the UTRAN or GERAN for a period of time to avoid handover of the UE to the E-UTRAN.

In Example 16, the subject matter of one or any combination of Examples 12-15 can optionally include the value of the timer being communicated to the E-UTRAN during performance of the subsequent handover of the UE to the E-UTRAN.

In Example 17, the subject matter of one or any combination of Examples 12-16 can optionally include the IDC interference being caused by interference of communications with the circuitry arranged to perform RAN communications to the E-UTRAN, conflicting with communications with the circuitry arranged to perform radio communications in the ISM radio frequency band, the communications in the ISM radio frequency band being communicated with a wireless local area network (WLAN) radio, a wireless personal area network (WPAN) radio, or a Global Navigation Satellite System (GNSS) radio of the UE.

In Example 18, the subject matter of one or any combination of Examples 12-17 can optionally include circuitry arranged to receive radio communications from a Global Navigation Satellite System (GNSS); wherein the IDC interference includes interference occurring between the radio communications with the E-UTRAN and the radio communications from the GNSS.

Example 19 can include, or can optionally be combined with all or portions of the subject matter of one or any combination of Examples 1-18 to include the subject matter embodied by a method performed by a radio access network (RAN) for management of handover of a user equipment (UE) to an evolved UMTS Terrestrial Radio Access Network (E-UTRAN) based on in-device coexistence (IDC) interference conditions at the UE, with operations including: receiving, at the RAN from the UE, an indication of IDC interference of radio communications exchanged with the E-UTRAN; and preventing handover of the UE from the RAN to the E-UTRAN in response to the indication of the IDC interference.

In Example 20, the subject matter of Example 19 can optionally include the RAN being a UMTS Terrestrial Radio Access Network (UTRAN) or a GSM EDGE Radio Access Network (GERAN).

In Example 21, the subject matter of one or any combination of Examples 19-20 can optionally include the indication of the IDC interference being produced at the UE in response to measurements, at the UE, of IDC interference occurring between a Long Term Evolution (LTE) radio of the UE arranged for communication with the E-UTRAN, and a wireless local area network (WLAN) radio, a wireless personal area network (WPAN) radio, or a Global Navigation Satellite System (GNSS) radio of the UE.

In Example 22, the subject matter of one or any combination of Examples 19-21 can optionally include the IDC interference occurring: between radio transmissions of LTE Band 40 and a 2.4 GHz industrial scientific medical (ISM) frequency band, between radio transmissions of LTE Band 7 and the 2.4 GHz ISM frequency band, between radio transmissions of 2.4 GHz ISM bands and LTE Band 40, or between radio transmissions of LTE Band 7, LTE Band 13, or LTE Band 14 and reception of the GNSS radio.

In Example 23, the subject matter of one or any combination of Examples 19-22 can optionally include transmitting an IDC indication setting from the RAN to the UE, the IDC indication setting providing an instruction to the UE to transmit the indication of the IDC interference to the RAN.

In Example 24, the subject matter of one or any combination of Examples 19-23 can optionally include receiving, from the UE, a subsequent indication of an absence of the IDC interference communicated to the RAN, the subsequent indication provided in response to subsequent measurements performed at the UE that indicate a lack of IDC interference occurring with the E-UTRAN; and performing handover of the UE to the E-UTRAN from the RAN in response to the subsequent indication of the absence of the IDC interference.

In Example 25, the subject matter of one or any combination of Examples 19-24 can optionally include receiving a handover preparation message at the RAN from the E-UTRAN indicating the IDC interference; preventing handover of the UE from the RAN to the E-UTRAN, with use of a timer, for a period of time to avoid handover to the E-UTRAN; and communicating a value of the timer from the RAN to the UE in a handover preparation message.

Example 26 can include, or can optionally be combined with all or portions of the subject matter of one or any combination of Examples 1-25 to include the subject matter embodied by a radio access network (RAN) system, comprising: a primary radio access network (RAN) provided from an evolved UMTS Terrestrial Radio Access Network (E-UTRAN) and arranged for radio communication with a user equipment (UE); and a secondary RAN provided from a UMTS Terrestrial Radio Access Network (UTRAN) or a GSM EDGE Radio Access Network (GERAN) and arranged for radio communication with the UE, wherein the secondary RAN is arranged to manage handover of the UE to the E-UTRAN in response to operations to: communicate, from the secondary RAN to the UE, an indication setting used to request an indication of in-device coexistence (IDC) interference of UE radio communications with frequency bands used by the E-UTRAN; receive, at the secondary RAN from the UE, the indication of IDC interference of UE radio communications with the frequency bands used by the E-UTRAN; and preventing handover from the secondary RAN to the E-UTRAN in response to the indication of the IDC interference.

In Example 27, the subject matter of Example 26 can optionally include the indication of the IDC interference being produced at the UE in response to measurements, at the UE, of IDC interference occurring between a Long Term Evolution (LTE) radio of the UE arranged for communication with the E-UTRAN, and a wireless local area network (WLAN), a wireless personal area network (WPAN) radio, or a Global Navigation Satellite System (GNSS) radio of the UE.

In Example 28, the subject matter of one or any combination of Examples 26-27 can optionally include the IDC interference occurring: between radio transmissions of LTE Band 40 and a 2.4 GHz industrial scientific medical (ISM) frequency band, between radio transmissions of LTE Band 7 and the 2.4 GHz ISM frequency band, between radio transmissions of 2.4 GHz ISM bands and LTE Band 40, or between transmissions of LTE Band 7, LTE Band 13, or LTE Band 14 and reception of the GNSS radio.

In Example 29, the subject matter of one or any combination of Examples 26-28 can optionally include the RAN being arranged to perform handover of the UE from the secondary RAN to the E-UTRAN in response to a subsequent indication of absence of the IDC interference.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. At least one non-transitory machine-readable medium including instructions for execution on circuitry of a user equipment (UE), which when executed by the UE, cause the UE to perform electronic operations for management of evolved UMTS Terrestrial Radio Access Network (E-UTRAN) handover that:
   perform measurements, at the UE, to determine in-device coexistence (IDC) interference occurring with radio communications of the E-UTRAN; and
   transmit an indication of the IDC interference to a radio access network;
   wherein a UMTS Terrestrial Radio Access Network (UTRAN) or a GSM EDGE Radio Access Network (GERAN) refrains from performing a handover from the UTRAN or the GERAN to the E-UTRAN in response to the indication of the IDC interference.

2. The machine-readable medium of claim 1, wherein the instructions further cause the UE to perform electronic operations that:
   receive an IDC indication setting from the UTRAN or the GERAN, the IDC indication setting provided to instruct the UE to transmit the indication of the IDC interference to the UTRAN or the GERAN.

3. The machine-readable medium of claim 2, wherein the instructions further cause the UE to perform electronic operations that:
   transmit an IDC indication capability to the UTRAN or the GERAN prior to receiving the IDC indication setting from the UTRAN or the GERAN;
   wherein the indication of the IDC interference is transmitted by the UE in response to receiving the IDC indication setting that instructs the UE to transmit the indication of the IDC interference to the UTRAN or the GERAN.

4. The machine-readable medium of claim 1, wherein the indication of the IDC interference includes:
   a listing of one or more E-UTRAN carrier frequencies affected by the IDC interference, and a direction of the IDC interference.

5. The machine-readable medium of claim 1, wherein the indication of the IDC interference is transmitted to the UTRAN or the GERAN, and wherein the instructions further cause the UE to perform electronic operations that:
   perform subsequent measurements, at the UE, to determine an absence of IDC interference occurring with radio communications of the E-UTRAN; and
   transmit a subsequent indication of the absence of the IDC interference to the UTRAN or the GERAN;
   wherein handover of the UE is performed from the UTRAN or the GERAN to the E-UTRAN in response to the subsequent indication of the absence of the IDC interference.

6. The machine-readable medium of claim 1, wherein the E-UTRAN indicates that a cause of the handover is from the IDC interference by adding a bit in a handover preparation message, wherein the handover preparation message includes a listing of one or more E-UTRAN carrier frequencies affected by the IDC interference.

7. The machine-readable medium of claim 1, wherein the UE coordinates with a network implementation of the management of the E-UTRAN handover to prevent handover, wherein the network implementation of the management of the E-UTRAN handover includes receipt of a handover preparation message at the UTRAN or the GERAN from the E-UTRAN indicating the IDC interference, and use of a timer at the UTRAN or the GERAN to avoid handover of the UE to the E-UTRAN for a period of time, and wherein one or more handover preparation messages exchanged between UTRAN or GERAN nodes include a current value of the timer.

8. The machine-readable medium of claim 1, wherein one or more handover preparation messages exchanged between UTRAN or GERAN nodes include an indication that the UE is affected by the IDC interference, and wherein the handover preparation messages exchanged between the UTRAN or GERAN nodes include a listing of one or more E-UTRAN carrier frequencies affected by the IDC interference.

9. The machine-readable medium of claim 1, wherein the UE performs a UE implementation of the management of the E-UTRAN handover to prevent handover, wherein the UE implementation of the management of the E-UTRAN handover includes receipt and processing by the UE of a reference signal received from the E-UTRAN, and communication of pessimistic measurements of the reference signal received from the E-UTRAN; and
   wherein the indication of the IDC interference includes the pessimistic measurements, and wherein handover to the E-UTRAN is avoided from the UTRAN or the GERAN in response to the pessimistic measurements.

10. The machine-readable medium of claim 1, wherein the IDC interference is caused by interference of a Long Term Evolution (LTE) radio of the UE, with a wireless local area network (WLAN) radio, a wireless personal area network (WPAN) radio, or a Global Navigation Satellite System (GNSS) radio of the UE.

11. The machine-readable medium of claim 10, wherein the IDC interference occurs:
   between radio transmissions of LTE Band 40 and a 2.4 GHz industrial scientific medical (ISM) frequency band, between radio transmissions of LTE Band 7 and the 2.4 GHz ISM frequency band, between radio transmissions of 2.4 GHz ISM bands and LTE Band 40, or between radio transmissions of LTE Band 7, LTE Band 13, or LTE Band 14 and reception of the GNSS radio.

12. An apparatus of a user equipment (UE), the apparatus comprising processing circuitry and memory configured to perform management of evolved UMTS Terrestrial Radio Access Network (E-UTRAN) handover with electronic operations that:
   perform measurements to determine in-device coexistence (IDC) interference occurring with radio communications between the UE and the E-UTRAN; and
   transmit an indication of the IDC interference to a secondary radio access network (RAN);
   wherein the secondary RAN refrains from performing a handover to the E-UTRAN in response to the indication of the IDC interference.

13. The apparatus of claim 12, wherein the secondary RAN is a UMTS Terrestrial Radio Access Network (UTRAN) or a GSM EDGE Radio Access Network (GERAN).

14. The apparatus of claim 12, wherein the IDC interference is caused by interference of a Long Term Evolution (LTE) radio of the UE, with a wireless local area network (WLAN) radio, a wireless personal area network (WPAN) radio, or a Global Navigation Satellite System (GNSS) radio of the UE, and wherein the IDC interference occurs:

between radio transmissions of LTE Band 40 and a 2.4 GHz industrial scientific medical (ISM) frequency band, between radio transmissions of LTE Band 7 and the 2.4 GHz ISM frequency band, between radio transmissions of 2.4 GHz ISM bands and LTE Band 40, or between radio transmissions of LTE Band 7, LTE Band 13, or LTE Band 14 and reception of the GNSS radio.

15. An apparatus of an evolved NodeB (eNodeB), the apparatus comprising transceiver circuitry and processing circuitry to implement an evolved UMTS Terrestrial Radio Access Network (E-UTRAN), wherein the eNodeB is to monitor in-device coexistence (IDC) interference conditions at a user equipment (UE) in communication with the eNodeB, the processing circuitry and transceiver circuitry configured to:
   transmit, to a secondary radio access network (RAN), an indication of IDC interference of radio communications exchanged between the UE and the E-UTRAN; and
   prevent handover of the UE from the secondary RAN to the E-UTRAN in response to the indication of the IDC interference.

16. The apparatus of claim 15, wherein the secondary RAN is a UMTS Terrestrial Radio Access Network (UTRAN) or a GSM EDGE Radio Access Network (GERAN).

17. The eNodeB of claim 15, wherein the eNodeB is further to perform electronic operations that:
   receive, from the UE, the indication of the IDC interference of the radio communications exchanged between the UE and the E-UTRAN;
   wherein the indication of the IDC interference is generated at the UE in response to measurements, at the UE, of IDC interference occurring between a Long Term Evolution (LTE) radio of the UE arranged for communication with the E-UTRAN, and a wireless local area network (WLAN) radio, a wireless personal area network (WPAN) radio, or a Global Navigation Satellite System (GNSS) radio of the UE.

18. The eNodeB of claim 17, wherein the IDC interference occurs:
   between radio transmissions of LTE Band 40 and a 2.4 GHz industrial scientific medical (ISM) frequency band, between radio transmissions of LTE Band 7 and the 2.4 GHz ISM frequency band, between radio transmissions of 2.4 GHz ISM bands and LTE Band 40, or between radio transmissions of LTE Band 7, LTE Band 13, or LTE Band 14 and reception of the GNSS radio.

19. The eNodeB of claim 17, wherein the indication of the IDC interference is transmitted from the UE in response to receipt of an IDC indication setting at the UE, the IDC indication setting providing an instruction to the UE to subsequently transmit the indication of the IDC interference to the eNodeB.

20. The eNodeB of claim 15, wherein the eNodeB is further to perform electronic operations that:
   receive, from the UE, a subsequent indication of an absence of the IDC interference, the subsequent indication provided in response to subsequent measurements performed at the UE that indicate the absence of IDC interference occurring with the E-UTRAN; and
   enable handover of the UE from the secondary RAN to the E-UTRAN in response to the subsequent indication of the absence of the IDC interference.

21. The eNodeB of claim 15, wherein the eNodeB is further to perform electronic operations that:
   transmit a handover preparation message from the E-UTRAN to the secondary RAN indicating the IDC interference; and
   prevent handover of the UE from the secondary RAN to the E-UTRAN, with use of a timer, for a period of time to avoid handover from the secondary RAN to the E-UTRAN;
   wherein a value of the timer is communicated to at least one node of the secondary RAN.

22. At least one non-transitory machine-readable medium including instructions for execution on circuitry of an evolved NodeB (eNodeB), which when executed by the eNodeB, cause the eNodeB to perform electronic operations for management of handover of a user equipment (UE) to an evolved UMTS Terrestrial Radio Access Network (E-UTRAN) of the eNodeB based on in-device coexistence (IDC) interference conditions at the UE, with operations that:
   transmit, to a secondary radio access network (RAN), an indication of IDC interference of radio communications exchanged between the UE and the E-UTRAN; and
   prevent handover of the UE from the secondary RAN to the E-UTRAN in response to the indication of the IDC interference.

23. The machine-readable medium of claim 22, wherein the secondary RAN is a UMTS Terrestrial Radio Access Network (UTRAN) or a GSM EDGE Radio Access Network (GERAN).

24. The machine-readable medium of claim 22, wherein the instructions further cause the eNodeB to perform electronic operations that:
   receive, from the UE, the indication of the IDC interference of the radio communications exchanged between the UE and the E-UTRAN;
   wherein the indication of the IDC interference is generated at the UE in response to measurements, at the UE, of IDC interference occurring between a Long Term Evolution (LTE) radio of the UE arranged for communication with the E-UTRAN, and a wireless local area network (WLAN) radio, a wireless personal area network (WPAN) radio, or a Global Navigation Satellite System (GNSS) radio of the UE.

25. The machine-readable medium of claim 24, wherein the IDC interference occurs:
   between radio transmissions of LTE Band 40 and a 2.4 GHz industrial scientific medical (ISM) frequency band, between radio transmissions of LTE Band 7 and the 2.4 GHz ISM frequency band, between radio transmissions of 2.4 GHz ISM bands and LTE Band 40, or between radio transmissions of LTE Band 7, LTE Band 13, or LTE Band 14 and reception of the GNSS radio.

26. The machine-readable medium of claim 22, wherein the indication of the IDC interference is transmitted from the UE in response to receipt of an IDC indication setting at the UE, the IDC indication setting providing an instruction to the UE to subsequently transmit the indication of the IDC interference to the eNodeB.

27. The machine-readable medium of claim 22, wherein the instructions further cause the eNodeB to perform electronic operations that:
   receive, from the UE, a subsequent indication of an absence of the IDC interference communicated to the secondary RAN, the subsequent indication provided in response to subsequent measurements performed at the UE that indicate the absence of IDC interference occurring with the E-UTRAN; and perform handover of the UE to the E-UTRAN from the secondary RAN in response to the subsequent indication of the absence of the IDC interference.

28. The machine-readable medium of claim 22, wherein the instructions further cause the eNodeB to perform electronic operations that:
   transmit a handover preparation message from the E-UTRAN to the secondary RAN indicating the IDC interference; and
   prevent handover of the UE from the secondary RAN to the E-UTRAN, with use of a timer, for a period of time to avoid handover to the E-UTRAN;
   wherein a value of the timer is communicated to at least one node of the secondary RAN.

* * * * *